(12) United States Patent
Baird et al.

(10) Patent No.: US 12,734,919 B2
(45) Date of Patent: Sep. 15, 2026

(54) EQUIPMENT MOUNTING SUPPORT BASE

(71) Applicant: CORESTATES CONSTRUCTION SERVICES, INC., Duluth, GA (US)

(72) Inventors: Brian Baird, Riverside, CA (US); Nathan Mcgee, Fontana, CA (US); Cristian De Sande, Riverside, CA (US); Mark Becher, Fullerton, CA (US); Dan Marketta, Freehold, NJ (US)

(73) Assignee: CORESTATES CONSTRUCTION SERVICES, INC., Duluth, GA (US)

(*) Notice: Subject to any disclaimer, the term of this patent is extended or adjusted under 35 U.S.C. 154(b) by 0 days.

(21) Appl. No.: 19/311,623

(22) Filed: Aug. 27, 2025

(65) Prior Publication Data

US 2026/0061867 A1 Mar. 5, 2026

Related U.S. Application Data

(60) Provisional application No. 63/689,202, filed on Aug. 30, 2024.

(51) Int. Cl.
*B60L 53/31* (2019.01)

(52) U.S. Cl.
CPC .................................... *B60L 53/31* (2019.02)

(58) Field of Classification Search
CPC .......... E02D 27/42; E02D 27/44; B60L 53/31
(Continued)

(56) References Cited

U.S. PATENT DOCUMENTS 3,962,660 A * 6/1976 Duckett .................. H02B 7/06 248/346.02
4,267,399 A * 5/1981 Lux, Jr. .................... H02G 9/10 174/1

(Continued)

FOREIGN PATENT DOCUMENTS

DE 2020018100822 U1 3/2019
KR 102091163 B1 3/2020

OTHER PUBLICATIONS

Car Charge Now, "Pre Cast Slabs Made to Order", https://carchargenow.com/product/pre-cast-slab, accessed Aug. 17, 2024.

(Continued)

*Primary Examiner* — Paola Agudelo
(74) *Attorney, Agent, or Firm* — Perilla Knox & Hildebrandt LLP

(57) ABSTRACT

A support base system includes a mounting pad, at least one support frame, and at least one equipment-specific mounting plate, which are together used for mounting equipment. The pad includes an opening through which cable is routed into the equipment. Each support frame is located within the pad opening and includes an aligned frame opening through which the cable is routed into the equipment. And each equipment-specific mounting plate is removably attached to and supported by the support frame and includes an aligned equipment-specific opening through which the cable is routed into the equipment. The equipment-specific mounting plates are interchangeably mountable to the support frame so that when changing out the equipment, the mounting plate can be changed out too, but the same pad and support frame can be used. Methods of manufacturing, installing, and retrofitting the support base are also provided.

20 Claims, 15 Drawing Sheets

(58) Field of Classification Search
USPC .................................... 52/294; 320/109, 107
See application file for complete search history.

(56) References Cited

U.S. PATENT DOCUMENTS 4,644,095 A * 2/1987 Bright ................ H05K 7/20145 174/38
5,630,303 A * 5/1997 Devenish, III .......... E02D 27/32 248/346.03
6,186,468 B1 * 2/2001 Schlegel .................. F16M 5/00 248/346.02
6,321,928 B1 * 11/2001 Goldenstein ............ E02D 27/42 220/484
9,376,831 B2 6/2016 Hokfelt
11,159,033 B2 10/2021 Molle
11,313,385 B1 * 4/2022 Evans ..................... E02D 27/52
11,365,845 B1 * 6/2022 Carpenter ............... F24F 13/32
11,571,979 B2 2/2023 Flynn et al.
11,897,354 B2 2/2024 Soroky et al.
2012/0228466 A1 * 9/2012 Haidvogl ................ E02D 27/44 248/679
2014/0261050 A1 * 9/2014 Knapp .................... B60S 13/02 52/29
2020/0144774 A1 5/2020 Wankoff et al.
2022/0234460 A1 7/2022 Palmer
2023/0143736 A1 5/2023 Maezawa
2023/0311686 A1 10/2023 Zarraonandia
2023/0347768 A1 11/2023 Tolnar et al.
2023/0365014 A1 11/2023 Svensson
2023/0415597 A1 12/2023 Jette et al.
2024/0075834 A1 3/2024 Michael et al.
2024/0075835 A1 3/2024 Michael et al.
2024/0166066 A1 5/2024 Bowen et al.
2024/0218628 A1 7/2024 Svensson et al.
2024/0246434 A1 7/2024 Raynor
2024/0270102 A1 8/2024 Delahaut et al.
2024/0322577 A1 9/2024 Zarraonandia
2024/0416774 A1 12/2024 Rogge et al.
2025/0010744 A1 1/2025 Loose
2025/0038509 A1 1/2025 Parsons et al.

OTHER PUBLICATIONS

Photo of Miller EV Metal Skid (found on-line).
Miller Electric Company, "Miller Electric Company Electric Vehicle Solutions Making the Lifecycle of Your EV Infrastructure" Brochure, pp. 1-12, Jacksonville, FL.
Shoals, "AC Level 2 Quick Connect Base" Data Sheet, Rev. D, Jun. 29, 2023.
Shoals, "DCFC 2X3 Quick Connect Base" Data Sheet, Rev. A, Oct. 6, 2023.
Shoals, "EV Power Center" Data Sheet, Rev. F, Oct. 17, 2023.
Shoals, "EV Power Center Lite" Data Sheet, Rev. A, Mar. 18, 2024.
Tesla Motors, "Pre-Fabricated Concrete Tesla Supercharge Pedestals", https://www.reddit.com/r/teslamotors/comments/mwluso/prefabricated_concrete . . . , accessed U.S. Appl. No. 08/172,024.

* cited by examiner

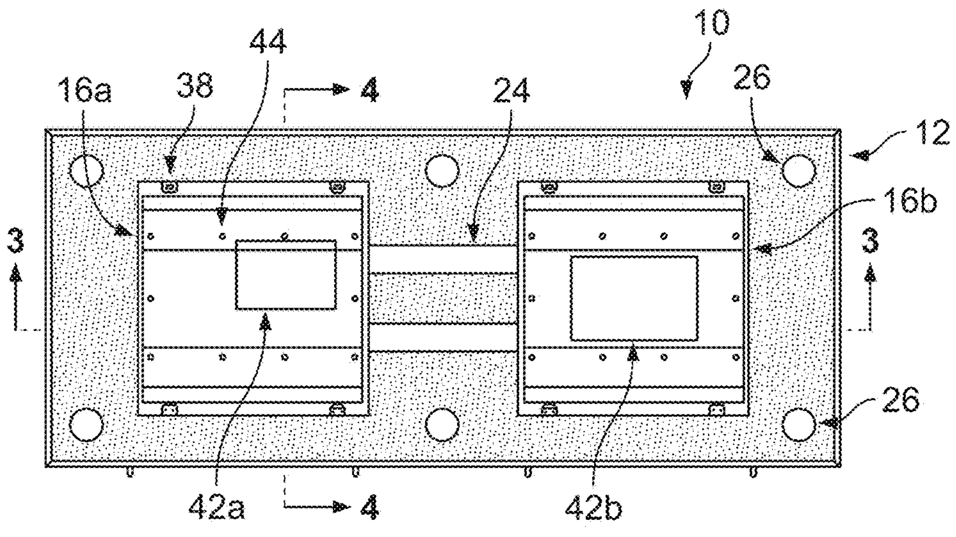
FIG. 2
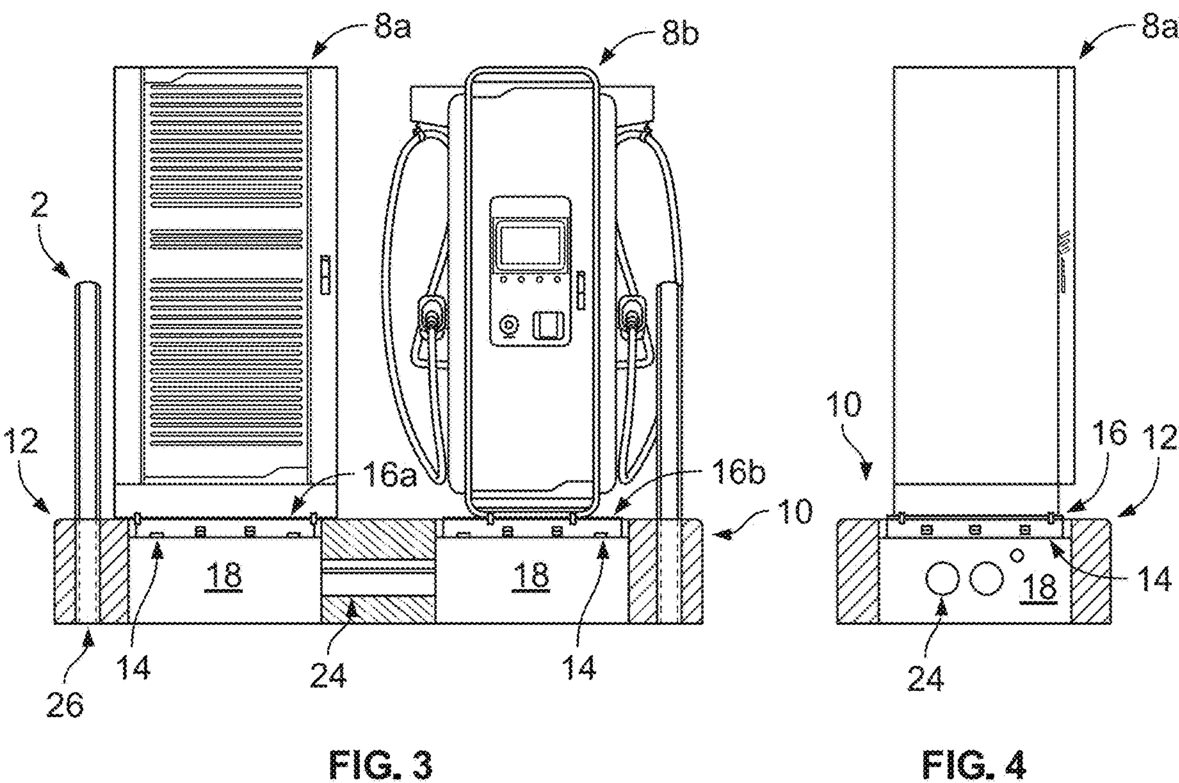
FIG. 3
FIG. 4

124
138
19
19
126

210
212
242
24
216
24

216
210
212

216
210
212
214

316
342
110
316
342
316
312
312
354
352
312
312

312
310
318
354
324
352
318

EQUIPMENT MOUNTING SUPPORT BASE

CROSS-REFERENCE TO RELATED APPLICATION

This application claims the priority benefit of U.S. Provisional Patent Application Ser. No. 63/689,202, filed Aug. 30, 2024, which is hereby incorporated herein by reference.

TECHNICAL FIELD

This invention relates generally to ground-supported bases for supporting and mounting equipment powered by underground power lines, and more particularly to mounting pads for electrical equipment such as EV charging stations.

BACKGROUND

Many types of equipment are commonly supported upon and mounted onto support/mounting bases (also referred to herein synonymously as platforms) that are mounted into and/or on the ground and support the equipment stably in place. Such bases/platforms are often used for electrical equipment that is powered by underground power lines, such as electric charging equipment for electric vehicles (EVs). Commonly, these bases are provided by mounting pads made of precast concrete to provide strength and durability, though other materials such as polymers, fiberglass, metals, composites, etc. are sometimes used.

At least one manufacturer of EV-charging equipment provides bases in the form of precast concrete pads designed exclusively for its own equipment. Other manufacturers of EV charging equipment provide bases in the form of custom-built metal skids or above-ground raceways that are also designed exclusively for their own equipment. But because each of these support/mounting bases/platforms is designed with mounting and/or access features (e.g., conduits and/or other openings for cables to be routed through, for securing mounting fasteners, etc.) for exclusive use with one particular manufacturer's EV-charging equipment, they cannot readily be used with EV-charging equipment provided by other manufacturers. So new installations require a particular base/platform for the specific EV-charging equipment being installed. And for replacement/upgrade installations using a different manufacturer's EV-charging equipment, the entire installation (including the entire mounting base system) must be changed out.

Accordingly, it can be seen that needs exist for improvements in equipment-mounting bases/platforms. It is to the provision of solutions meeting these and other needs that the present invention is primarily directed.

SUMMARY

Generally described, the present invention relates to support bases for mounting equipment, for example equipment powered by underground power cables/lines. The support bases each include a mounting pad, at least one support frame, and at least one equipment-specific mounting plate. The pad includes an opening through which cable is routed into the equipment. Each support frame is located within the pad opening and includes an aligned frame opening through which the cable is routed into the equipment. And each equipment-specific mounting plate is removably attached to and supported by the support frame and includes an aligned equipment-specific opening through which the cable is routed into the equipment. The equipment-specific mounting plates are interchangeably mountable to the support frame so that when changing out the equipment, the mounting plate can be changed out too, but the same pad and support frame can be used. Methods of manufacturing, installing, and retrofitting the support base are also provided.

The specific techniques and structures employed to improve over the drawbacks of the prior art and accomplish the advantages described herein will become apparent from the following detailed description of example embodiments and the appended drawings and claims.

BRIEF DESCRIPTION OF THE DRAWINGS

FIG. 2 is a plan view of the support base of FIG. 1, with the support frame (below and covered by the mounting plate) shown here for presentation purposes.

FIG. 3 is a cross-sectional view of the support base taken at line 3-3 of FIG. 2, shown supporting the power cabinet and EV dispenser equipment of FIG. 1.

FIG. 4 is a side view of the support base and equipment of FIG. 3.

DETAILED DESCRIPTION OF EXAMPLE EMBODIMENTS

Figure 1:
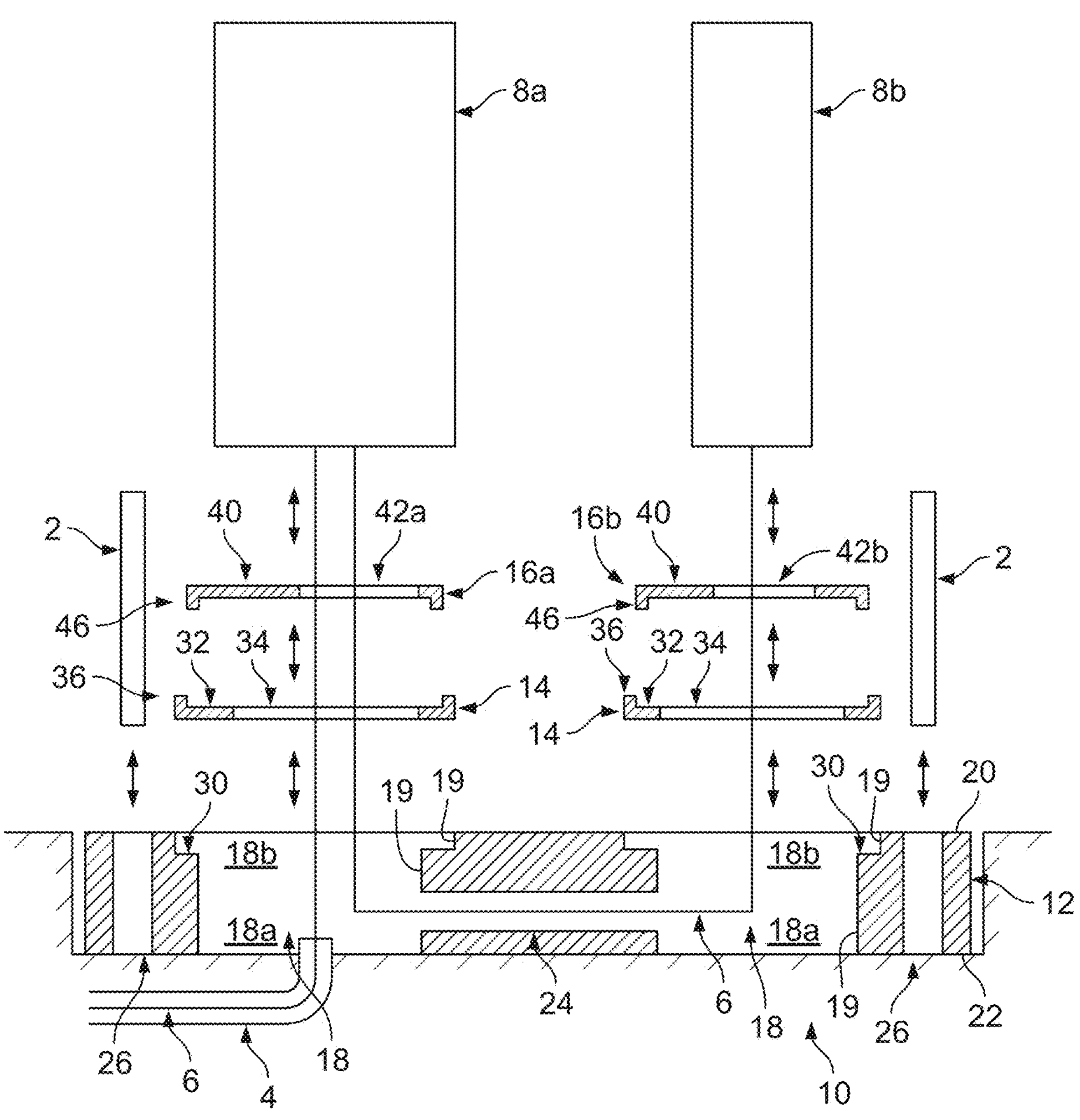
FIG. 1 is an exploded cross-sectional schematic view of an equipment-mounting support base according to a first example embodiment, showing a pad, two support frames, and two mounting plates that together support power cabinet and EV dispenser equipment.

The present invention generally relates to improved mounting bases for equipment. The mounting bases are ground-supported, that is, mounted into and/or onto the ground surface, including compacted soil, gravel, asphalt, concrete, and/or the like. The bases are described herein as being bases or platforms, with these terms intended to be synonymous and broadly construed to include conventional equipment-mounting pads as well as skids, foundations, pedestals, and other mounting bases.

Also, the ground-supported mounting bases are for supporting electrical equipment powered by underground power lines, with the equipment typically mounting in place to the bases. In the embodiment described herein, for example, the bases are for mounting electric charging equipment in electric vehicle charging stations for electric vehicles (EVs), with the equipment powered by underground power lines that are routed upward through the ground, through the base, and into the equipment, so that the power lines are not exposed (they're underground or contained within the base and equipment). Typical use is for EV chargers and related equipment (e.g., DCFC 480v chargers, level two 208v chargers, power cabinets, rectifiers/inverters, and electrical switchgear) for public, commercial, and/or industrial use (e.g., fast chargers for cars and trucks, as well as chargers for buses and tractor trailers/semis in industrial and commercial applications). In other embodiments, the bases are adapted for supporting and mounting other types of electrical equipment powered by underground power lines, for example electrical distribution equipment (e.g., transformers and switchgear) for industrial and commercial use, etc. In yet other embodiments, the bases are adapted for use to support other types of electrical (and other) equipment requiring bottom access features (e.g., conduits and/or other openings for cables to be routed through, etc.).

FIGS. 1-16 show an equipment-mounting support base 10 according to a first example embodiment. The base or platform 10 includes a pad 12, at least one support frame 14, and at least one mounting plate 16, which all cooperate to enable equipment 8 to be mounted to and supported on the platform 10.

FIG. 1 is an exploded cross-sectional schematic view of the support base 10 with equipment 8 mounted to it. As depicted, the pad 12 and support frame 14 can be used with a range of different types and/or models of equipment 8, with different mounting plates 16 used based on the particular piece of equipment 8 to be mounted. For example, the pad 12 and support frame 14 can be used for mounting a power cabinet **8*a* (for rectifiers, controls, fault-current protection, etc.) and/or an EV dispenser (i.e., charger) 8*b* (the various equipment 8*a* and 8*b* collectively referred to herein as "the equipment 8"), with a corresponding different power-cabinet mounting plate 16*a* or EV-dispenser mounting plate 16*b* (the various mounting plates 16*a* and 16*b* collectively referred to herein as "the mounting plates 16"). The depicted mounting plates 16 and equipment 8 are representative for explanation purposes, and other equipment 8 and corresponding mounting plates 16 can be used with the pad 12 and support frame 14**.

Figure 15:
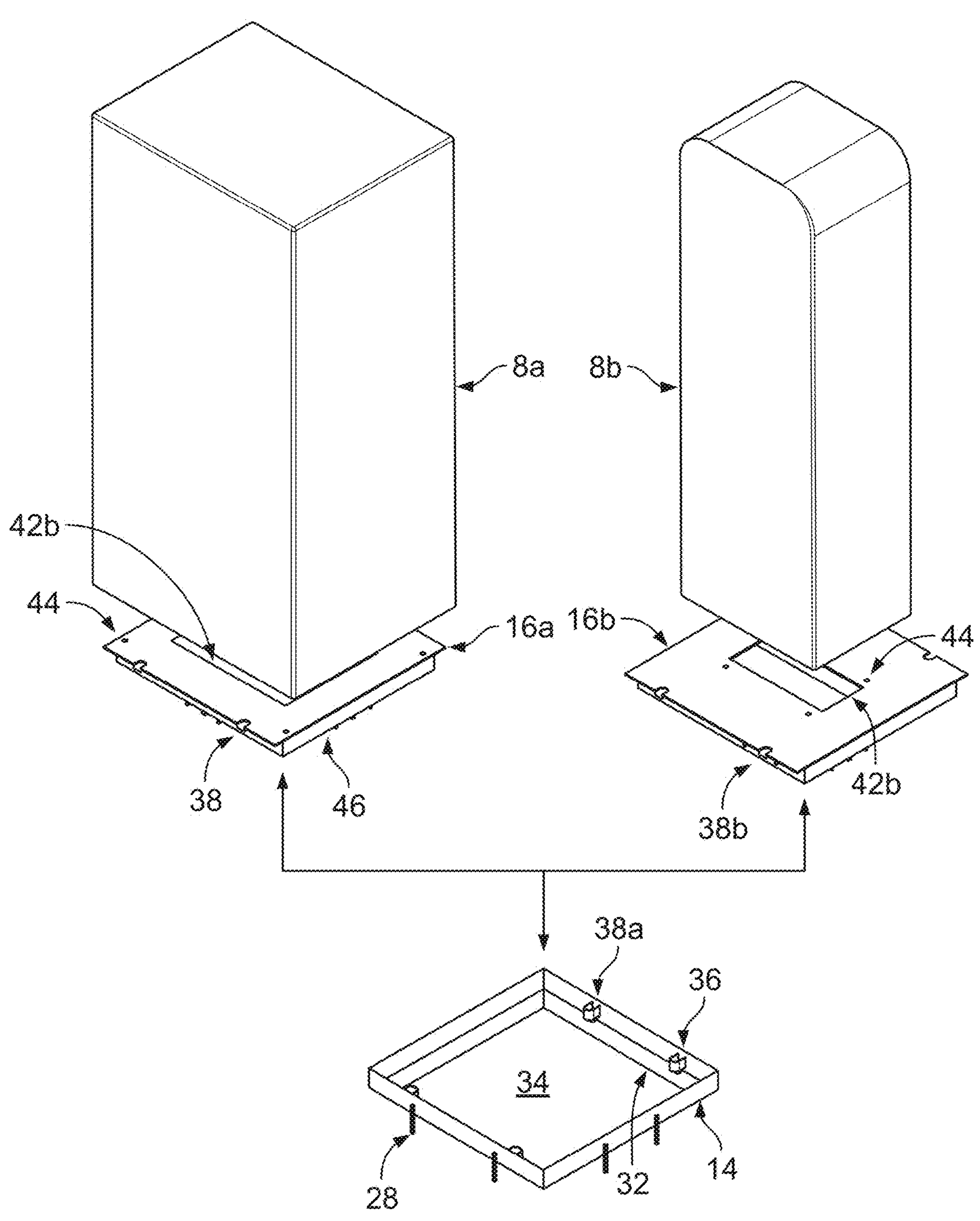
FIG. 15 is an exploded perspective view of one of the support frames, two of the mounting plates, and two of the equipment pieces of FIG. 1, showing the single support plate interchangeably used with two different mounting plates and equipment pieces.

This innovative arrangement provides for a range of different equipment-specific mounting plates 16 to be interchangeably used with the same pad 12 and support frame 14, with the particular mounting plate 16 selected based on the equipment 8 to be mounted on the base 10 (see FIG. 15). So when a piece of equipment 8 needs to be changed out, the entire installation, including the entire base system 10, does not need to be torn out. Instead, the existing equipment 8 can be removed, the existing equipment-specific mounting plate 16 for that equipment 8 can be removed from the existing pad 12 and support frame 14, a different/replacement equipment-specific mounting plate 16 (selected for the different/replacement equipment 8) can be installed onto the existing pad 12 and support frame 14, and the different/replacement equipment 8 can be installed onto the different/replacement mounting plate 16.

The pad 12 can be made of precast concrete or other suitable materials (e.g., polymers, fiberglass, metals, composites, etc.). The depicted pad 12 is rectangular, though in other embodiments it can have a circular, polygonal, or other regular or irregular shape. The pad 12 can be of the same basic design and construction as a conventional equipment-mounting pad, with modifications including those described herein. As such, conventional details of the design and construction of the pad 12 are known to those of ordinary skill in the art and are thus not included for brevity.

In the embodiments described herein, the pad 12 is preformed (e.g., precast concrete pads) and the support frame 14 attached to it (e.g., during casting) to form a pad-and-frame assembly off-site, which is then transported (along with the selected mounting plate/s 16) to the jobsite for installation. In other embodiments, the pad can be formed in the field at the installation location (e.g., poured-in-place concrete foundations/pads) and the support frame 14 attached at the jobsite.

The pad 12 includes at least one through opening 18 extending all the way through the pad 12 from its top surface 20 to its bottom surface 22. The base 10 is typically installed recessed into the ground, with its top surface 20 able to be flush or raised above the ground (on at least one side for a sloped grade), with flush including within ½ inches of ground level and having a beveled edge (for ADA compliance). Also, the pad bottom surface 22 faces downward toward/against the ground and the opening 18 provides a passage for routing underground electrical cables (e.g., power, communication, and/or control lines) 6 up through the base 10 and into the equipment 8 so they can be internally connected to the equipment 8. The cables 6 are typically installed in conventional underground conduits 4 that terminate within the opening 18. The cables 6 are shown schematically to indicate their general position only, in practice the shown cables 6 are typically a plurality of the cables 6 (e.g., two to five 480v conductors for AC and DC power and low-voltage wiring for communication and controls).

The pad through-openings 18 are configured (i.e., sized, shaped, and located) so that they enable the cables 6 to be passed through them and into a bottom-access opening of the equipment 8 supported on the base 10. Also, the openings 18 are configured and located so that they provide this functionality for a number of different types and/or models of the equipment 8. Thus, the pad openings 18 are typically sized larger than needed for any given piece of equipment 8, so the cables 6 can be routed through the pad openings 18 in a range of different locations as needed for the different bottom-access openings and cable termination locations of the different types and/or models of equipment 8. The openings 18 can be rectangular (as depicted) or they can have another shape (e.g., circular, polygonal, or another regular or irregular shape).

The pad openings 18 each include a lower opening portion 18*a* and an upper opening portion 18*b* defined by an inner wall 19 of the pad 12. The upper opening portion 18*b* has a larger plan-view size than the lower opening portion 18*a*, with a ledge 30 defining and separating the two, and with the ledge 30 inset into the top 20 of the pad 12 and facing upward. The ledge 30 typically extends peripherally all the way around the opening 18, though in some embodiments it can have a gap or not extend along one side of the opening, if desired. (Extending "around" the opening does not mean the opening is round, though it can be.) The ledge 30 typically supports the support frame 14, as described below.

The depicted pad 12 is configured for mounting two pieces of equipment 8 (i.e., its sized large enough and shaped to underlay and support both pieces of equipment 8), and it has two of the openings 18 for accommodating the cabling 6 of both pieces of equipment 8. In addition, the pad 12 includes at least one integral internal conduit 24 extending transversely between the two openings 18 for routing cables 6 between the two pieces of equipment 8. Typically, there are at least two (typically three) of the internal conduits 24 (between each adjacent openings 18) and they are spaced apart to provide sufficient electrical separation (e.g., insulation) between the cables 6 carried by them (e.g., 480v conductors and low-voltage wires). In the depicted embodiment, the internal conduits 24 are formed by conventional PVC piping precast into the concrete pad 12, but they can be formed in other conventional ways.

In other embodiments, the pad is configured for mounting three or more pieces of equipment 8, and as such has three or more corresponding openings for accommodating the cabling 6 of that equipment 8. For example, an EV charging station can include one power cabinet and a series of connected/powered EV dispensers mounted on the same pad. In yet other embodiments, the pad is configured for mounting only one piece of equipment 8, for example as described below.

In addition, the pad 12 can include integral receptacles 26 for receiving the bottoms of conventional bollards 2 installed to protect the equipment 8. Typically, the integral receptacles 26 are cylindrical for holding cylindrical bollards 2, though other shapes of bollards and receptacles can be used (e.g., rectangular, polygonal, or another regular or irregular shape). The integral receptacles 26 have an inner transverse dimension (e.g., inner diameter) that is slightly larger than an outer transverse dimension (e.g., outer diameter) of the bollards 2 such that the bollards 2 can be slid into the receptacles 26 and held there stably in an upright orientation. In the depicted embodiment, the internal receptacles 26 are formed by conventional metal sleeves precast into the concrete pad 12, but they can be formed in other conventional ways. In some embodiments, the bollards 2 are provided together with the platforms 10 as a package, and in other embodiments they are provided separately. In example embodiments, the sleeves are designed to allow for removable, lockable, or permanent bollard installation, or none at all by filling the sleeve.

For each through-opening 18 in the pad 12, a respective support frame 14 is included. In the depicted embodiment with two pad openings 18, there are two support frames 14. The support frames 14 are made of a material selected for strength and durability, for example a metal (as in the depicted embodiment). In other embodiments, the supports are made of other materials, for example they can be made of concrete when formed integrally with/into the pad.

The support frames 14 provide for transferring the load of the equipment from the mounting plates 16 to the pad 12, for example as described below. And the support frames 14 provide for removable attachment of the mounting plates 16 (e.g., the equipment 8 removably secures to the mounting plate 16, which removably secures to the support frame 14, with neither equipment 8 nor mounting plate 16 removably secured directly to the pad 12). This can be advantageous over removably attaching the mounting plates 16 to the pads 12 directly by conventional anchors, because anchoring directly into concrete pads can be challenging to align and cast threaded inserts correctly, and because post-installed anchors often are not allowed in precast applications, are time-consuming to install, and/or require special/extra inspections. As such, various embodiments described herein include removable attachment of the mounting plate 16 to the support frame 14 by attachment elements that do not require penetrations into the body/material of the pad 18 (no fastener (or other attachment element) that removably secures the equipment or the mounting plate penetrates (or otherwise engages) the pad), while the support frame 14 can be permanently secured to the pad 18 by anchors 28 into the pad 18 (that need not be removed to change out the mounting plate 16).

The support frames 14 are fixedly mounted to the pad 12 (as depicted) or integrally formed with the pad. In the depicted embodiment, the support frames 14 are secured to the pad 12 by anchors 28 (e.g., pieces of rebar) that are embedded into the concrete material of the pad during manufacture and cured there. In other embodiments, the support frames are secured to the pad by bolts, other conventional fasteners, or other structures. In yet other embodiments, the support frames are integrally formed by or into the pad by being an integral part of the pad (e.g., made of the same or a different material as the pad), including the frame being the same element as the pad ledge (without the frame being a separate component from the pad) though such embodiments do not provide the advantage of avoiding anchoring penetrations directly into the pad.

The support frames 14 can be seated into and supported on the ledge 30 (e.g., peripheral) of the respective opening 18 of the pad 12 that is inset into the top 20 of the pad 12 (as depicted). Thus, the support frames 14 are nested into the pad upper portion 18*b*, supported on the ledge 30 and adjacent the pad inner wall 19. In other embodiments, the support frames can be secured to the inner sidewall of the respective opening, they can be secured onto the pad top surface, or they can be otherwise secured in place.

The depicted support frames 14 are peripheral frames typically including a peripheral lip 32 that is laterally extending, supports the mounting plate 16, and is supported by the pad 12 (e.g., the ledge 30). The peripheral lip 32 defines a through opening 34 that provides a passage for routing the cables 6 through the base 10 so the cables 6 can be connected to the equipment 8. The frame openings 34 can be rectangular (as depicted) or they can have another shape (e.g., circular, polygonal, or another regular or irregular shape) to provide the functionality described herein. The frame openings 34 are configured (i.e., sized, shaped, and located) so that they enable the cables 6 to be passed through them and into the bottom-access opening of the equipment 8, which is aligned with (including within) the respective pad opening 18. The frame openings 34 have a transverse dimension (e.g., width) that typically is at least slightly smaller than a corresponding transverse dimension (e.g., width) of the respective pad opening 18 such that the support lip 32 in its entirety is contacting and supported by the pad ledge 30.

In addition, the support frames 14 typically further include an upright wall 36 that extends upward from the lip 32 on at least two (e.g., opposite) of the support frame sides and that seats the mounting plate 16 in place in a nested arrangement. For example, the depicted support frames 16 each have an upright wall 36 that is peripheral and thus on all four sides so that it extends all the way around the pad upper opening 16*b* and contacts/supported the overhanging peripheral outer edge portion of the mounting plate 16. This distributes the load of the heavy equipment over a larger area (relative to embodiments in which the upright wall 36 is not peripherally extending). This is because the panel 40 of the mounting plate 46 transfers the load downward through the frame upright wall 36 to the pad ledge 30.

In other embodiments, the upright wall of the support frame can be in the form of tabs or other non-contiguous elements. In yet other embodiments, the support frame does not include an upright wall (e.g., it's effectively a peripheral/annular flat panel that is formed by the peripheral lip and that supports the mounting plate), or the support frame does not extend peripherally all the way around the opening (e.g., it's two strips forming the lip).

Typically, the frame upright wall 36 has an upper end that terminates below the top surface 20 of the pad 12 by an inset spacing that is equal to the thickness of the overhanging panel portion 40 of the mounting plate 16 (see FIG. 16), with equal including no more than a negligible difference to provide the "flush" top surface functionality described herein). In this way, the upper end of the frame upright wall 36 supports the mounting plate 16 in a position flush with the top surface 20 of the pad 12.

The mounting plates 16 are removably attached to and supported by the support frames 14, with the equipment 8 securely mounting to and supported by the mounting pates 16. So the equipment 8 is supported by the mounting plates 16, which are supported by the support frames 14, which are supported by the pad 12. The mounting plates 16 are made of a material selected for strength and durability, for example a metal (as in the depicted embodiment), which can be the same or a different metal as the support 14. The mounting plates 16 are typically removably secured in place by attachment elements 38 (e.g., threaded bolts and holes, locking tabs and clips, or other conventional fastener or other attachments).

In the depicted embodiment, the mounting plates 16 seat into the respective support frames 14 in the pad upper opening portions 18*b*, so they are nested within the inner walls 19 of the pad upper opening portion 18*b* (e.g., also within the upright walls 36). Thus, the mounting plates 16 have plan-view dimensions that are smaller than plan-view dimensions of the pad upper opening portions 18*b* so that the mounting plates 16 can be completely received within the pad upper opening portions 18*b*. Typically, the mounting plates 16 seat into the respective support frames 14 so the top surface of the mounting plate 16 is flush with the top surface 20 of the pad 12. As used herein, "flush" includes minor deviations from precisely flush/even of the degree typical in the field, expressly including ½ inch (for ADA compliance). Also, the mounting plate 16 and pad 12 being flush with each other enables the equipment 8 in some embodiments (e.g., equipment with a larger footprint) to have edge/outer portions that overlap onto and are supported directly by the pad 12, instead of being only indirectly (via the support frame) supported by the pad 12.

In other embodiments, the mounting plate lies flat atop the pad and thus has larger plan-view dimensions than the pad upper opening portion. In some such embodiment, the base does not include the support frame and/or the pad opening ledge, as the mounting plate is supported by and secured to the pad top surface adjacent the pad opening. However, these embodiments are less preferred, for example because they do not provide the functionality described herein for example the flush mounting of the mounting plate to the pad top surface.

Figures 5, 6, 7, 8, 9, 10, 11, 12, 13, 14:
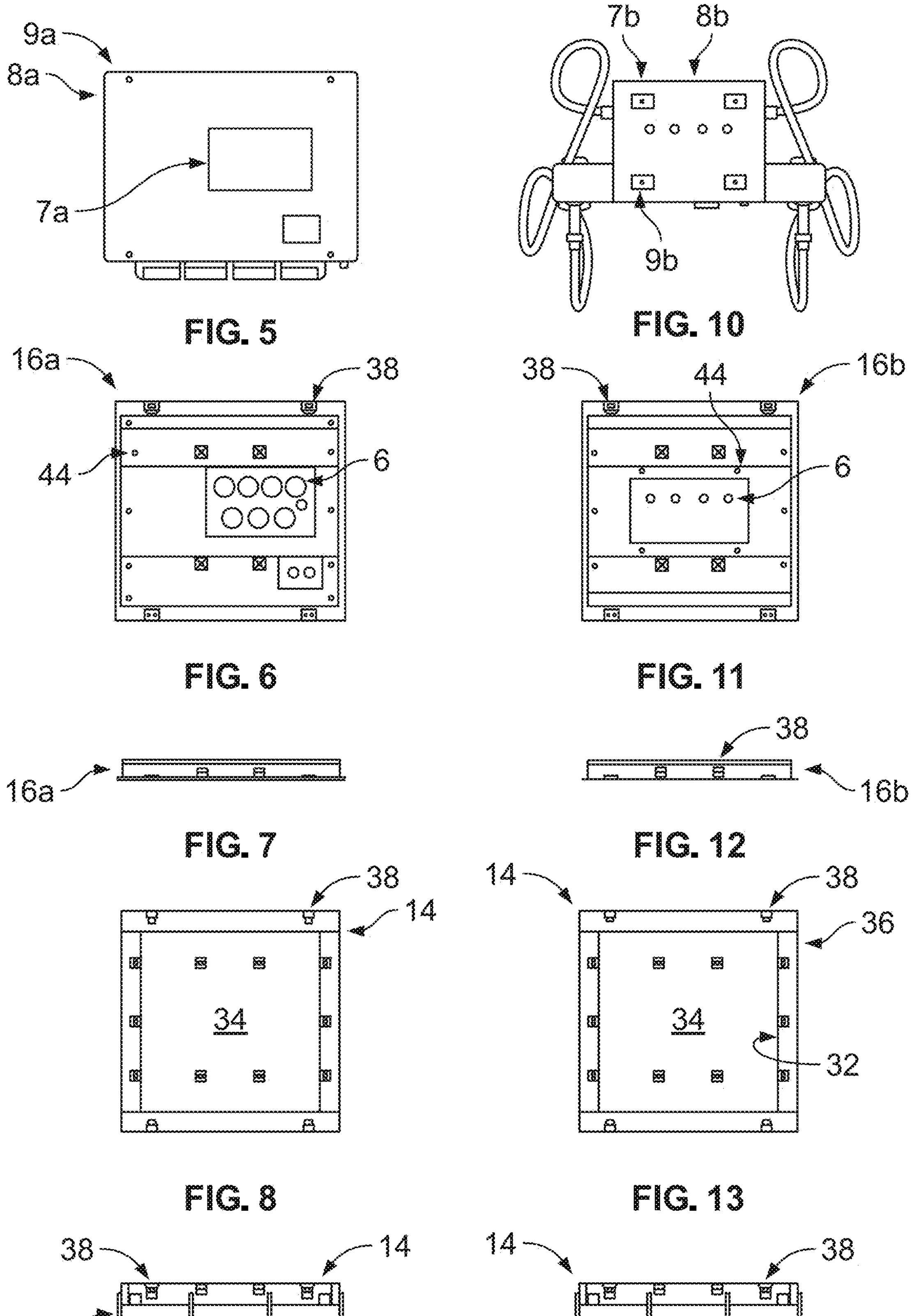
FIG. 5 is a bottom view of the power cabinet equipment of FIG. 3.
FIG. 6 is a plan view of the left mounting plate of FIG. 3, with the frame attachment elements (typically part of the support frame below and covered by the mounting plate) shown here for presentation purposes.
FIG. 7 is a front view of the left mounting plate of FIG. 6.
FIG. 8 is a plan view of the left support frame of FIG. 3.
FIG. 9 is a front view of the left support frame of FIG. 8.
FIG. 10 is a bottom view of the EV dispenser equipment of FIG. 3, schematically showing a bottom opening of the equipment.
FIG. 11 is a plan view of the right mounting plate of FIG. 3, with the frame attachment elements (typically part of the support frame below and covered by the mounting plate) shown here for presentation purposes.
FIG. 12 is a front view of the right mounting plate of FIG. 11.
FIG. 13 is a plan view of the right support frame of FIG. 3.
FIG. 14 is a front view of the right support frame of FIG. 13.

The mounting plates 16 include a panel 40 defining a through opening 42 that provides a passage for routing the cables 6 through the base 10 so the cables can be connected to the equipment 8. The plate openings 42 are configured (sized, shaped, and located) differently based on the particular piece of equipment 8 to be installed (note FIGS. 1-3). Thus, for installing a power cabinet 8*a*, the equipment-specific plate opening 42*a* is configured to receive the corresponding cables 6 at the location where they transition into the cabinet 8*a* (note also FIG. 6). And for installing an EV dispenser 8*b*, the equipment-specific plate opening 42*b* is configured differently to receive the corresponding cables 6 at the location where they transition into the EV dispenser 8*b* (note also FIG. 11). For example, the bottom openings 7*a* and 7*b* of the equipment 8*a* and 8*b* are shown in FIGS. 5 and 10, with these equipment bottom openings 7*a* and 7*b* cooperating with (e.g., aligning with or being within) the respective equipment-specific plate openings 42*a* and 42*b* (collectively, "the equipment-specific plate openings 42") of the mounting plates 16*a* and 16*b* to define where the cables 6 transition into the equipment 8. In this way, the same pad 12 and support frame 14 can be used with different types and models of equipment 8, simply by using the corresponding equipment-specific mounting plate 16 with the equipment-specific plate opening 42*a* or 42*b* (note also FIG. 15). This eliminates the need to change out the pad 12 when replacing or upgrading the equipment 8, as well as the need to obtain equipment-specific pads for new installations.

The equipment-specific plate openings 42 can be rectangular (as depicted) or they can have another shape (e.g., circular, polygonal, or another regular or irregular shape) to provide the functionality described herein. Typically, the equipment-specific plate opening 42 has the same general shape as the frame opening 34 and the pad opening 18. The equipment-specific plate openings 42 are sized and located so that they enable the cables 6 to be passed through them and into the bottom of the equipment 8 (i.e., aligned with (including within) the respective pad opening 18 and frame opening 34). Also, the equipment-specific plate openings 42 have plan-view/transverse dimensions (e.g., width and length) that typically are smaller than corresponding plan-view/transverse dimensions (e.g., width and length) of the respective frame opening 34. Further, the equipment-specific plate openings 42 are sized and located so that they are completely covered by the equipment 8 when installed, with the equipment 8 fully supported by the mounting plates 16 and/or the pads 12. As such, the equipment-specific plate opening 42*a* for the power cabinet 8*a* is off-center and smaller relative to equipment-specific plate opening 42*b* for the EV dispenser 8*b*, which is centered (in its mounting plate) and relatively larger (note FIG. 2). In some embodiments, the equipment-specific openings 42 are configured to snugly receive downward-extending flanges of the equipment 8 that form the bottom opening of the equipment 8 through which the cables 6 are routed for internal connection to the equipment 8.

The mounting plates 16 typically also include mounting elements 44*a* and 44*b* (collectively, "the equipment-specific mounting elements 44" or just "the mounting elements 44") for mounting the equipment 8 in place to the mounting plate 16. The mounting elements 44 can include for example bolt holes (see FIG. 15) or cross-member anchors (see FIGS. 11-12) (these are also shown in FIGS. 8-9 and 13-14, but are not part of the support frames 14). The equipment-specific mountings 44 are specific to the particular type and model of equipment 8 to be installed. For example, mounting elements 9*a* and 9*b* (e.g., bolt holes) of the equipment 8*a* and 8*b* are shown in FIGS. 5 and 10, with these mounting elements 9*a* and 9*b* cooperating (e.g., aligning) with the respective equipment-specific mounting elements 44*a* and 44*b*. As such, all mounting plates 16 can be the same except for their equipment-specific plate openings 42 and their equipment-specific mounting elements 44. Also, the mounting elements 44 are typically covered by the installed equipment 8 and accessed through an access door of the equipment after it's been positioned in place on the mounting plate 16.

The mounting plates 16 typically include an upright wall 46 extending downward from the panel 40 on at least two (e.g., opposite) of the panel sides. Thus, the weight/load from the equipment 8 is supported by the mounting plate panel 40, down through the mounting panel upright wall 46, down through the support frame lip 32, down through the pad ledge 30 and through the rest of the pad below the ledge to the ground. This enables the base system 10 to support power cabinets and EV dispensers that are heavier than those used for residential installations, for example DCFC chargers weighing 1500 lbs. to 2000 lbs. or more. For example, the depicted mounting plates 16 each have an upright wall 34 that is peripheral and thus on all four sides so that it extends all the way around the pad upper opening 16*b*. This distributes the load of the heavy equipment over a larger area (relative to embodiments in which the upright wall 46 is not peripherally extending).

In other embodiments, the upright wall of the mounting plate can be in the form of tabs or other non-contiguous elements. In still other embodiments, the mounting plate does not include an upright wall, so that it's effectively a peripheral/annular flat panel that rests directly upon the support frame.

In some embodiments, this upright wall is included as a part of the support frame, extending upward from the support frame lip, instead of being a part of the mounting plate. This upright wall of the support frame can be in addition to the frame upright wall described elsewhere herein.

The upright wall 46 of the mounting plate 16 typically has about the same height as the upright wall 36 of the support frame 14 so that the panel 40 (and thus the mounting plate 16) is flush with the top surface 20 of the pad 12. Thus, the upright wall 36 of the support frame 14 when installed can be positioned inset by a distance below the top surface 20 of the pad 12, and the panel 40 can have a thickness that is equal to that distance. In typical embodiments, the height of the upright walls 36 and 46 is about 2 inches to about 4.5 inches (e.g., about 3¼ inches), with the pad ledge 30 and the support-frame lip 32 inset a greater distance below the pad top surface 20, though taller or shorter upright walls and inset distances can be used based on the application. Also, in typical embodiments designed for supporting heavy EV dispensers such as those mentioned above, the panel 40 has a thickness of about 0.25 inch to about 1.05 inch (e.g., 0.5 inch) as do the uprights walls 36 and 46, though thicker or thinner panels and upright walls can be used based on the application.

As noted, the upright wall 46 of the mounting plate 16 is typically peripheral so that it extends all the way around the pad upper opening 16*b*. This distributes the load of the heavy equipment over a larger area (relative to embodiments in which the upright wall 46 is not peripherally extending). This is because the panel 40 of the mounting plate 46 transfers the load downward through the plate upright wall 46 to the pad ledge 30 (via the frame lip 32). Also, the upright wall 36 of the support frame 14 is typically peripheral so that it extends all the way around the pad upper opening 16*b* and contacts/supports the overhanging peripheral outer edge portion of the mounting plate 14. This distributes the load of the heavy equipment over a larger area (relative to embodiments in which the frame upright wall 36 is not peripherally extending). This is because the panel 40 of the mounting plate 46 transfers the load downward through the frame upright wall 36 (via the frame lip 32) to the pad ledge 30. But while this double-wall arrangement provides enhanced structural strength, it also introduces potential interference issues between the upright wall 46 and one or more of the attachment elements 38 that removably secure the mounting plate 16 in place. These attachment elements 38 typically include an attachment element 38*a* of the support frame 14, an attachment elements 38*b* of the mounting plate 16, and a fastener attachment elements 38*c* (collectively referred to herein as "the attachment elements 38"). To avoid this mechanical interference, the upright wall 46 and the attachment elements 38 can be specially arranged.

Figure 16:
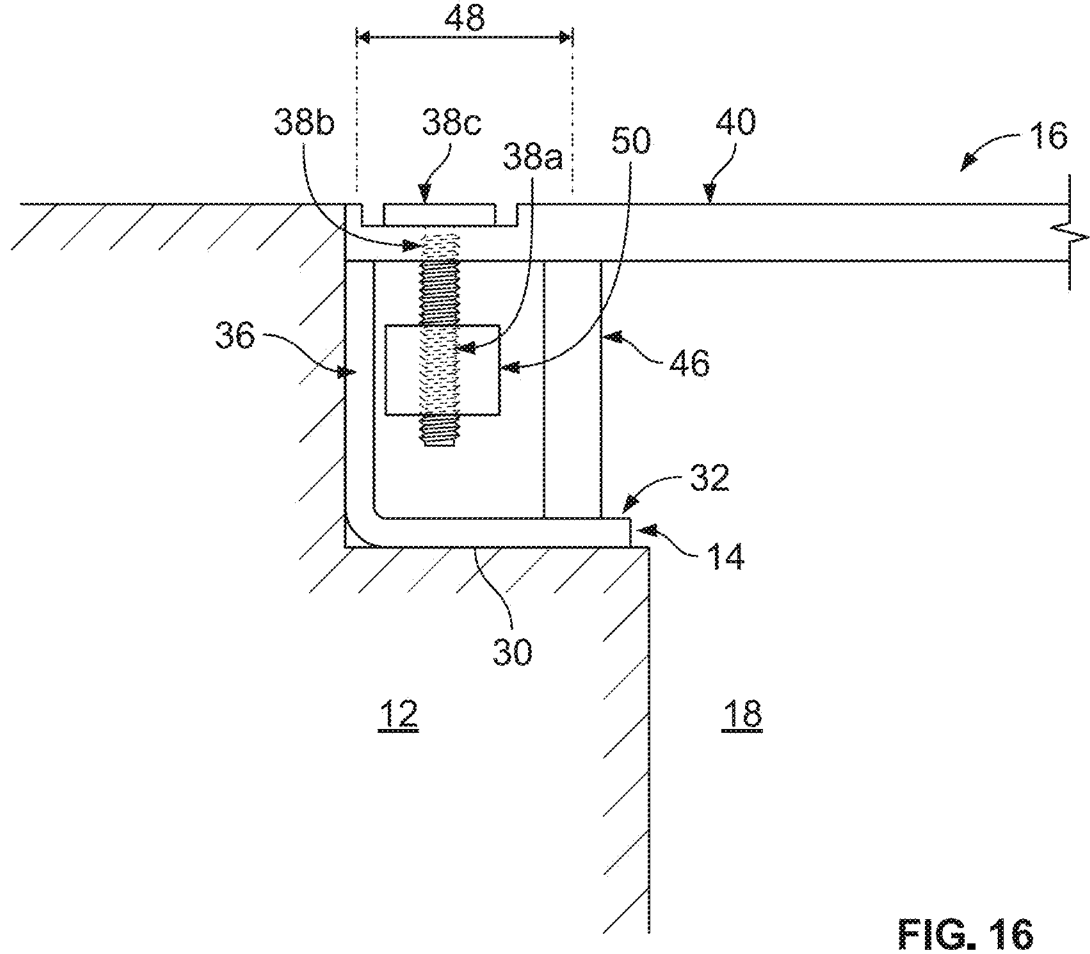
FIG. 16 is a detail view of a portion of the support base of FIG. 1, showing the mounting plate supported on the pad via the frame and plate upright walls and removably attached to the support frame by the attachment elements.

As shown in FIGS. 15-16, for example, the upright wall 46 can be positioned laterally inward from the outer edge of the mounting plate 16 to form a lateral offset 48, the plate attachment element 38*b* can be positioned in the mounting plate 46 within the lateral offset 48, and the frame attachment element 38*a* can be positioned on the support frame 14 within the lateral offset 48. The plate attachment element

38*b* can be a through-hole in the mounting pate 46, and the frame attachment element 38*a* can be a threaded-hole element (e.g., a nut or plate) that is mounted to the support frame 14 in alignment with the through-hole, so that a fastener attachment element (e.g., a threaded bolt) 38*c* can be installed through the aligned through-hole and threaded-hole element to secure the mounting plate 16 to the support frame 14. The frame attachment element (e.g., threaded nut) can be mounted to the support frame 14 by a bracket 50 (i.e., any mounting element that includes or holds in place the threaded-hole element), and the bracket 50 can extend laterally inward from the frame upright wall 36 (as depicted) or alternatively extend upward from the frame lip 32. It will be understood that other attachment elements 38 can be included, for example locking tabs and clips, or other conventional fastener or other attachments.

The attachment elements 38 can be on only two opposite sides of the support frame 14 and mounting plate 16, as depicted. In such embodiments, the lateral offset 48 can be on only those two sides, with the plate upright wall 46 on the other two opposite sides positioned laterally inward from the outer edge of the mounting plate 16 only enough to allow for the thickness of the frame upright wall 36 so that the peripheral outer edge of the mounting plate 16 can overhang and be supported by the frame upright wall 36. Other embodiments have the attachment elements on all four sides of the support frame and mounting plate. Also, the plate attachment through-hole 38*b* can include a head portion (e.g., countersunk or counterbored, as depicted) for receiving a head of the fastener attachment 38*c* to maintain it flush with the pad and the mounting plate. Further, the plate attachment elements 38*b* are the same on all mounting plates 16, with only the equipment-specific plate openings 42 and the equipment-specific mounting elements 44 being different.

In the depicted embodiment, the frame attachment elements (e.g., threaded nuts) 38*b* are held by individual brackets 50, with a respective bracket for each frame attachment element 38*b*. In other embodiments, the bracket can be in the form of a shelf extending inward from the frame upright wall, with multiple of the frame attachment elements held in place by it (e.g. the bracket shelf can extend peripherally around the support frame).

Figure 16A:
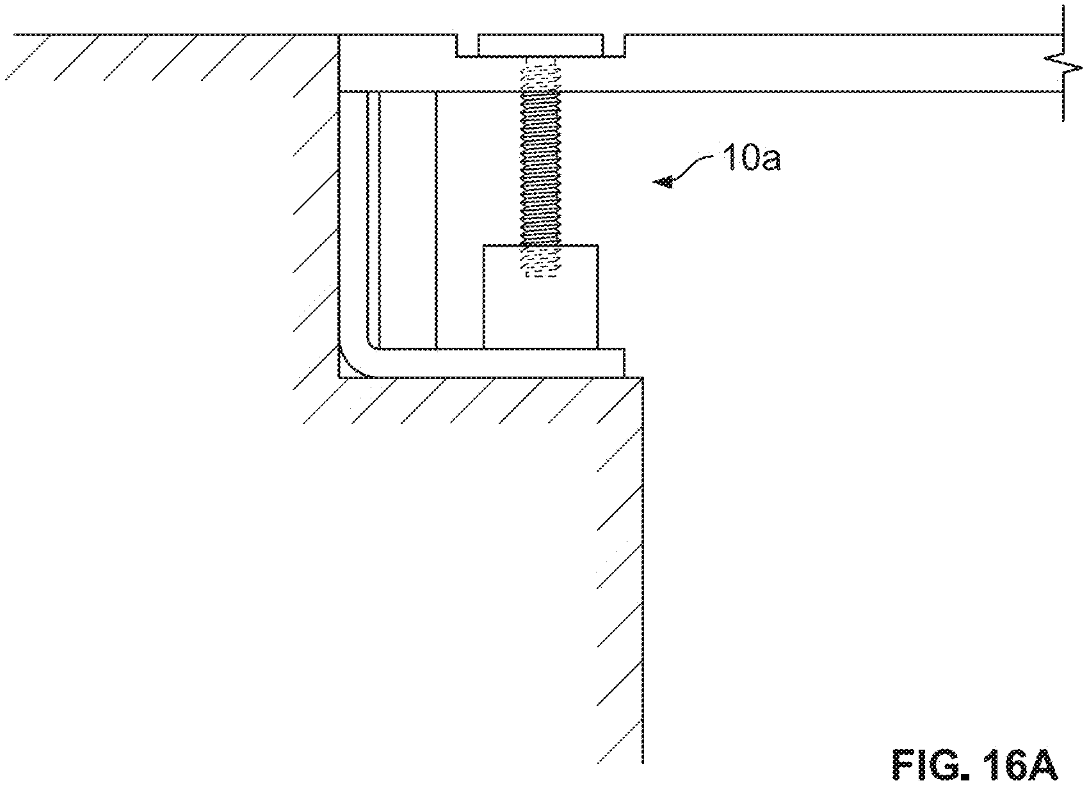
FIG. 16A is a detail view of a portion of an alternative support base according to another embodiment, showing the mounting plate supported on the pad via the frame and plate upright walls and removably attached to the support frame by the attachment elements.
Figures 17, 18:
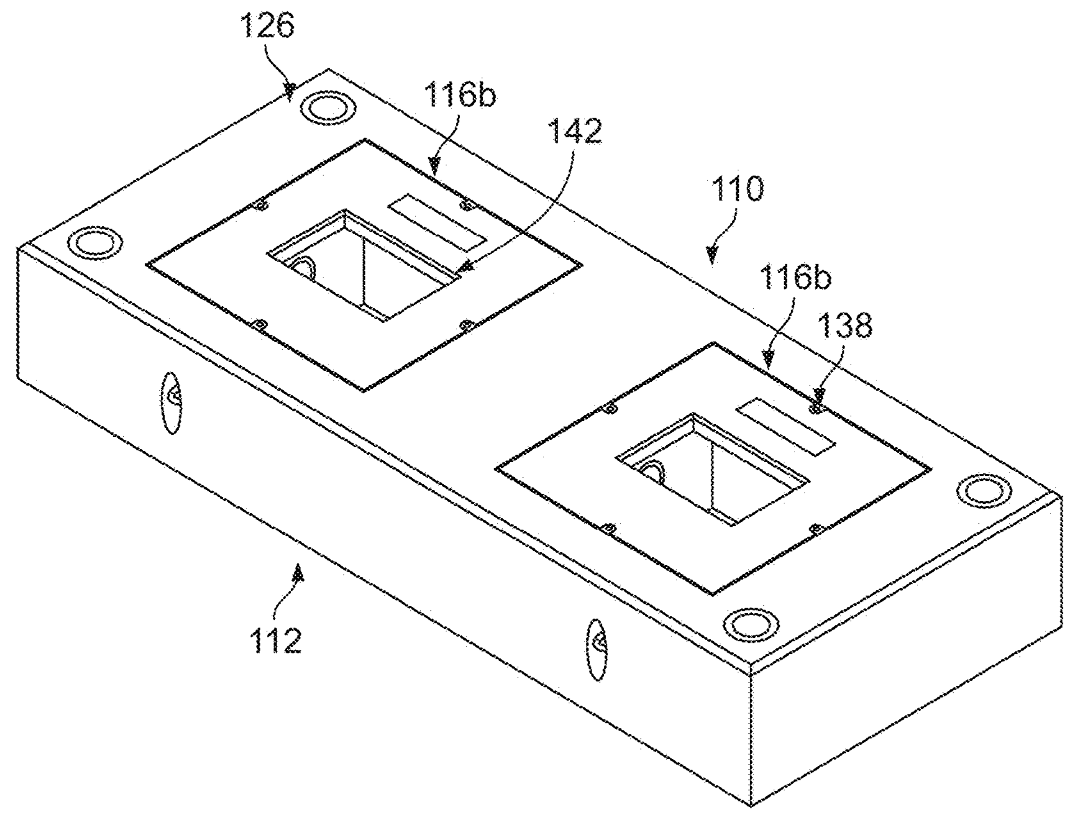
FIG. 17 is a perspective view of an equipment-mounting support base according to a second example embodiment, showing a pad, two support frames, and at two mounting plates for together supporting equipment.
FIG. 18 is a plan view of the support base of FIG. 17.
Figure 19:
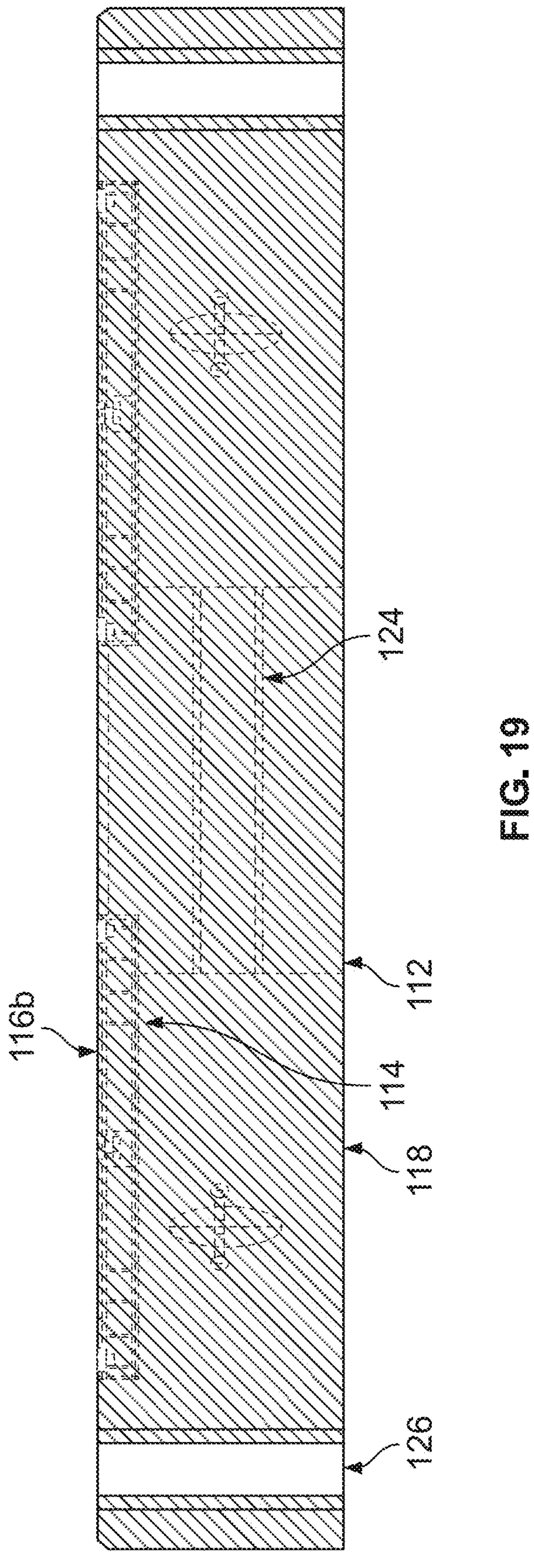
FIG. 19 is a cross-sectional view of the support base taken at line 19-19 of FIG. 18.

In other alternative embodiments, such as the support base 10*a* shown in FIG. 16A, the plate upright wall can be positioned adjacent the peripheral outer edge of the mounting plate, the plate attachment element (e.g., through-hole) can be positioned laterally inward from the plate upright wall, the frame attachment element (e.g., threaded-hole nut) can be positioned on the support frame inward from the plate upright wall, with the bracket (that holds the frame attachment element) extending upward from the frame lip so that the plate and frame attachment elements are aligned. In such embodiments, the plate upright wall that is adjacent the peripheral outer edge of the mounting plate can also be positioned laterally inward from the outer edge of the mounting plate only enough to allow for the thickness of the frame upright wall so that the peripheral outer edge of the mounting plate can overhang and be supported by the frame upright wall.

Other embodiments have one of the two upright walls but not the other. For example, some embodiments include the plate upright wall but not the frame upright wall, or the frame upright wall but not the plate upright. And as previously noted, some other embodiments with a double-wall arrangement have the inner upright wall extending upward from the frame and the outer upright wall extending downward from the plate, with other embodiments having both upright walls extending upward from the frame or downward from the plate. Other embodiments include a kit with a mounting pad, a support frame nested within the pad, and multiple of the mounting plates that each interchangeably nest into the frame and that are each configured for mounting use with a different piece of equipment.

FIGS. 17-21 show an equipment-mounting support base 110 according to a second example embodiment. The support base 110 includes a pad 112, at least one support frame 114, and at least one mounting plate 116 with at least one equipment-specific opening 142, which all cooperate to enable equipment to be mounted to and supported on the base 110. The components of the support base 100 of this embodiment can be the same, or substantially similar, as the embodiments described above, except as expressly noted. For example, the pad 112 includes the ledge 130, the mounting plate 116 includes the panel 140 and the upright wall 146, and attachment elements 138 are provided for removably securing the mounting plate 116 to the support frame 114.

Figure 21:
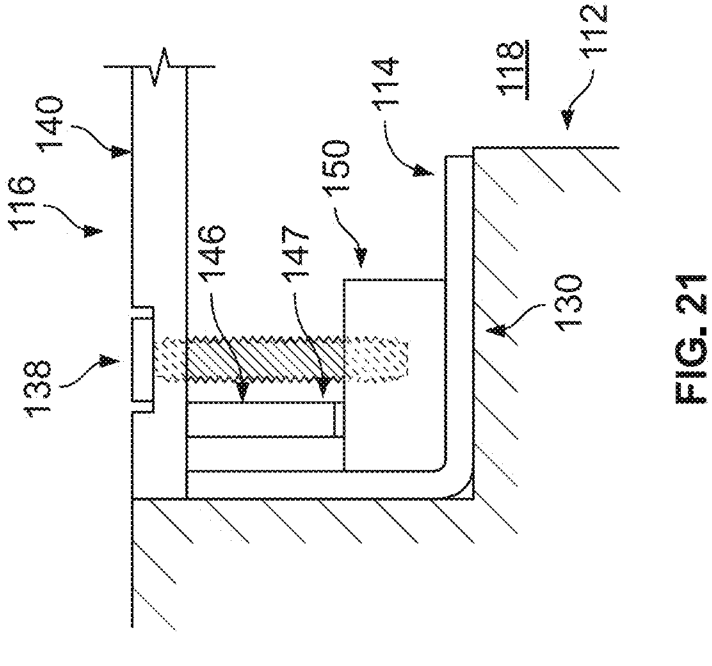
FIG. 21 is a cross-sectional view of the support base portion taken at line 21-21 of FIG. 20.
Figure 20:
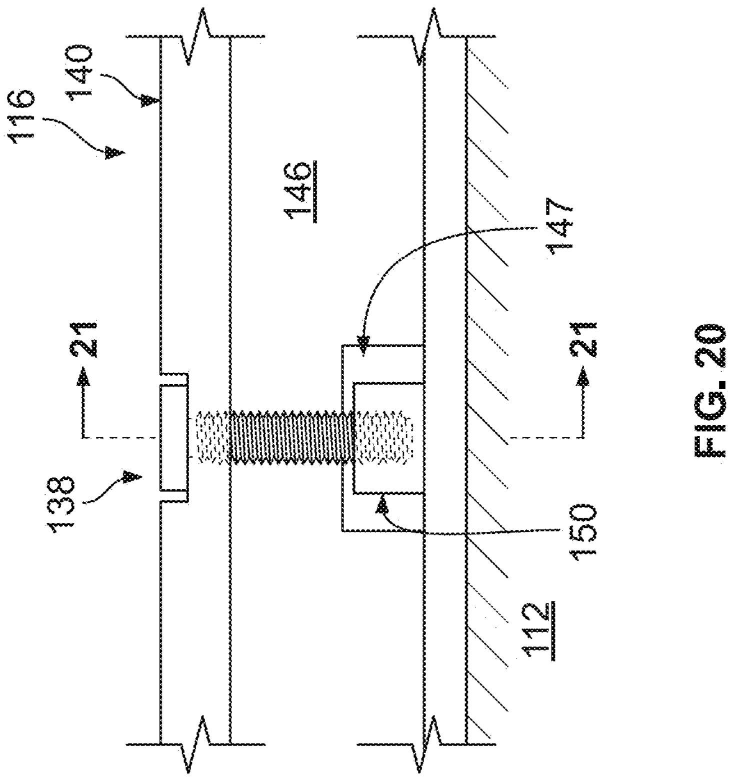
FIG. 20 is a detail view of a portion of the support base of FIG. 17, showing the mounting plate supported on the pad via the frame and plate upright walls and removably attached to the support frame by the attachment elements.

In this embodiment, however, the plate upright wall 146 is positioned adjacent the peripheral outer edge of the mounting plate and includes gaps 147 for receiving the brackets 150 for the frame attachment elements (e.g., threaded-hole nuts or plates), as shown in FIGS. 20-21. Although the plate upright wall 116 is not entirely peripheral, the only portions where it is not are at the gaps 147 for the attachment elements 38, thereby still providing advantageous strength for supporting heavy equipment. Also, the plate upright wall 146 that is adjacent the peripheral outer edge of the mounting plate 116 is positioned laterally inward from the outer edge of the mounting plate only enough to allow for the thickness of the frame upright wall so that the peripheral outer edge of the mounting plate overhangs and is supported by the frame upright wall 146. Further, the attachment elements 38 are on all four sides of the support frame 114 and mounting plate 116.

In addition, the pad 112 includes the integral receptacles 126 for receiving the bottoms of conventional bollards (not shown). Further, the pad 121 is configured for mounting two pieces of equipment (not shown), so it has two of the openings 118 for accommodating the cabling of both pieces of equipment, as well as at least one integral internal conduit 124 extending transversely between the two openings 118 for routing cables between the two pieces of equipment. Also, the pad 112 can include anchors (e.g., as depicted) for connecting lifting cables for use during installation.

Figures 22, 23, 24:
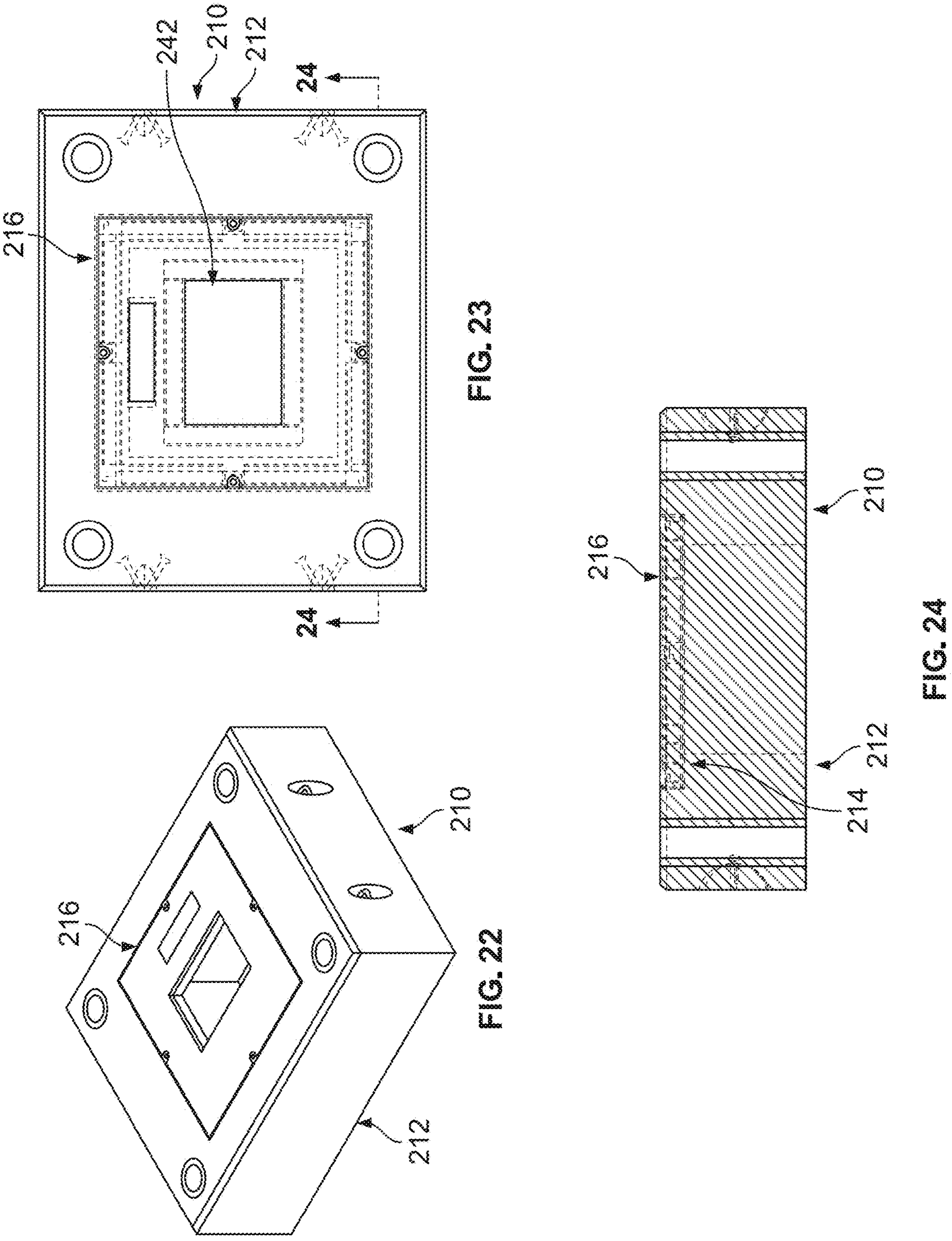
FIG. 22 is a perspective view of an equipment-mounting support base according to a third example embodiment, showing a pad, one support frame, and one mounting plate for together supporting equipment.
FIG. 23 is a plan view of the support base of FIG. 22.
FIG. 24 is a cross-sectional view of the support base taken at line 24-24 of FIG. 23.

FIGS. 22-24 show an equipment-mounting support base 210 according to a third example embodiment. The support base 210 includes a pad 212, at least one support frame 214, and at least one mounting plate 216 with at least one equipment-specific opening 242, which all cooperate to enable equipment to be mounted to and supported on the base 210. The components of the support base 210 of this embodiment can be the same, or substantially similar, as the embodiments described above, except as expressly noted.

In particular, the support base 210 of this embodiment is configured for mounting only one piece of equipment. As such, the base 210 includes only one pad opening 218 in the pad 212, one support frame 214, and one mounting plate 216. And because it includes only one pad opening 218, there are no internal conduits extending between pad openings.

Figures 25, 26:
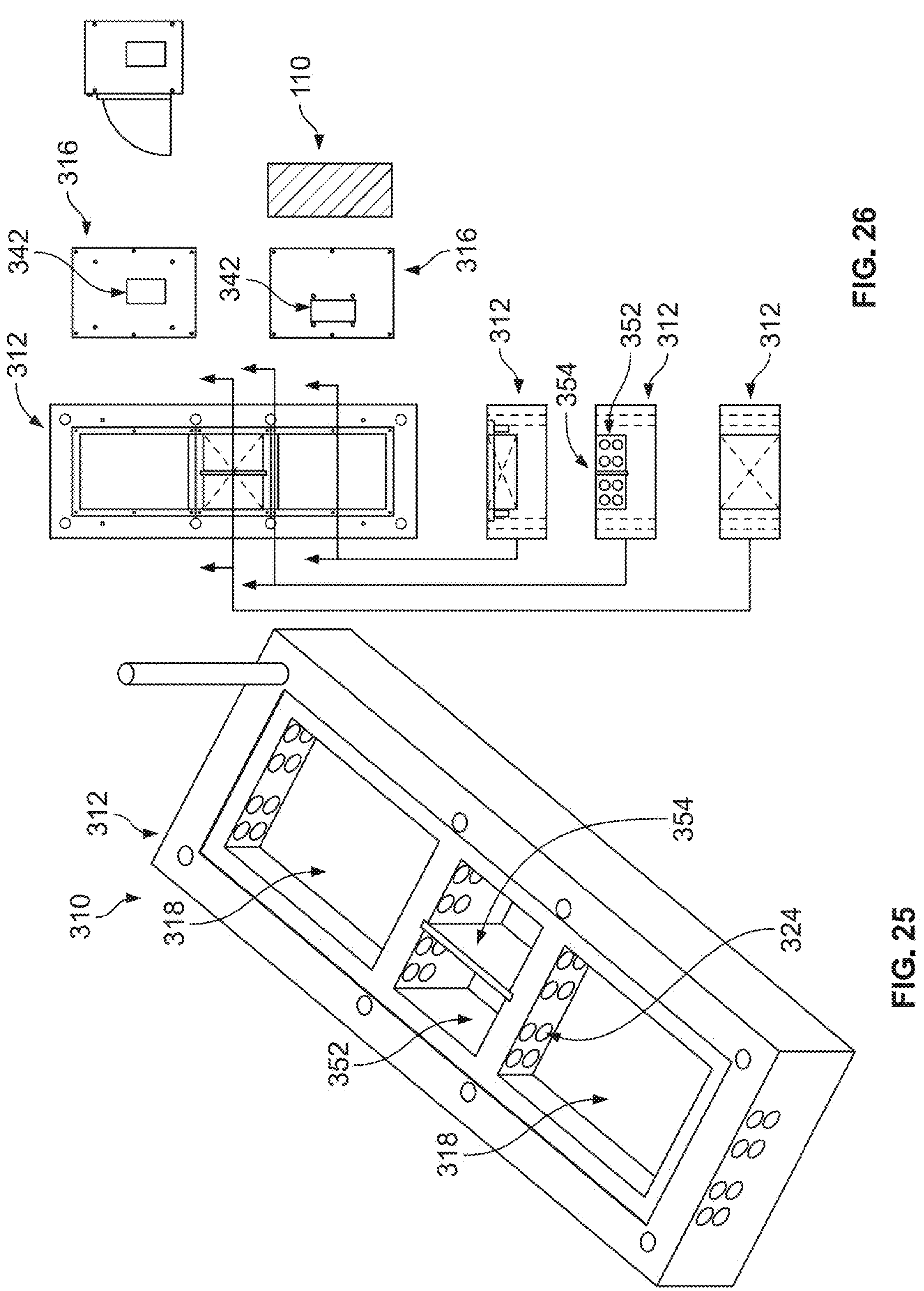
FIG. 25 is a perspective view of an equipment-mounting support base according to a fourth example embodiment, showing a pad, two support frames, and two mounting plates for together supporting equipment.
FIG. 26 is an exploded schematic composite view of the support base of FIG. 26 showing various cross-sectional views where indicated.
Figure 27:
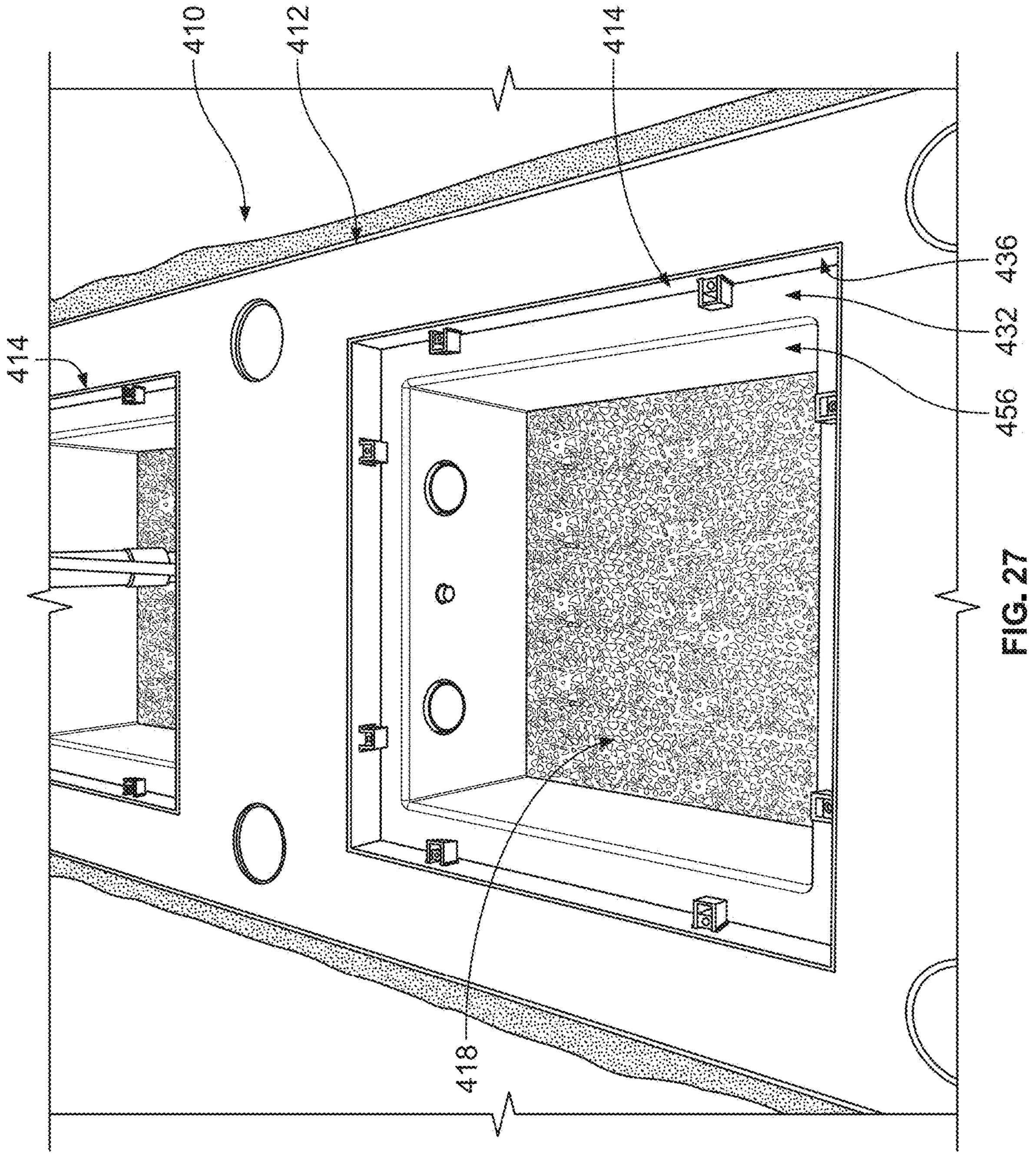
FIG. 27 is a perspective view of an equipment-mounting support base according to a fourth example embodiment, showing a pad and two support frames for use with two mounting plates for together supporting equipment.
Figure 28:
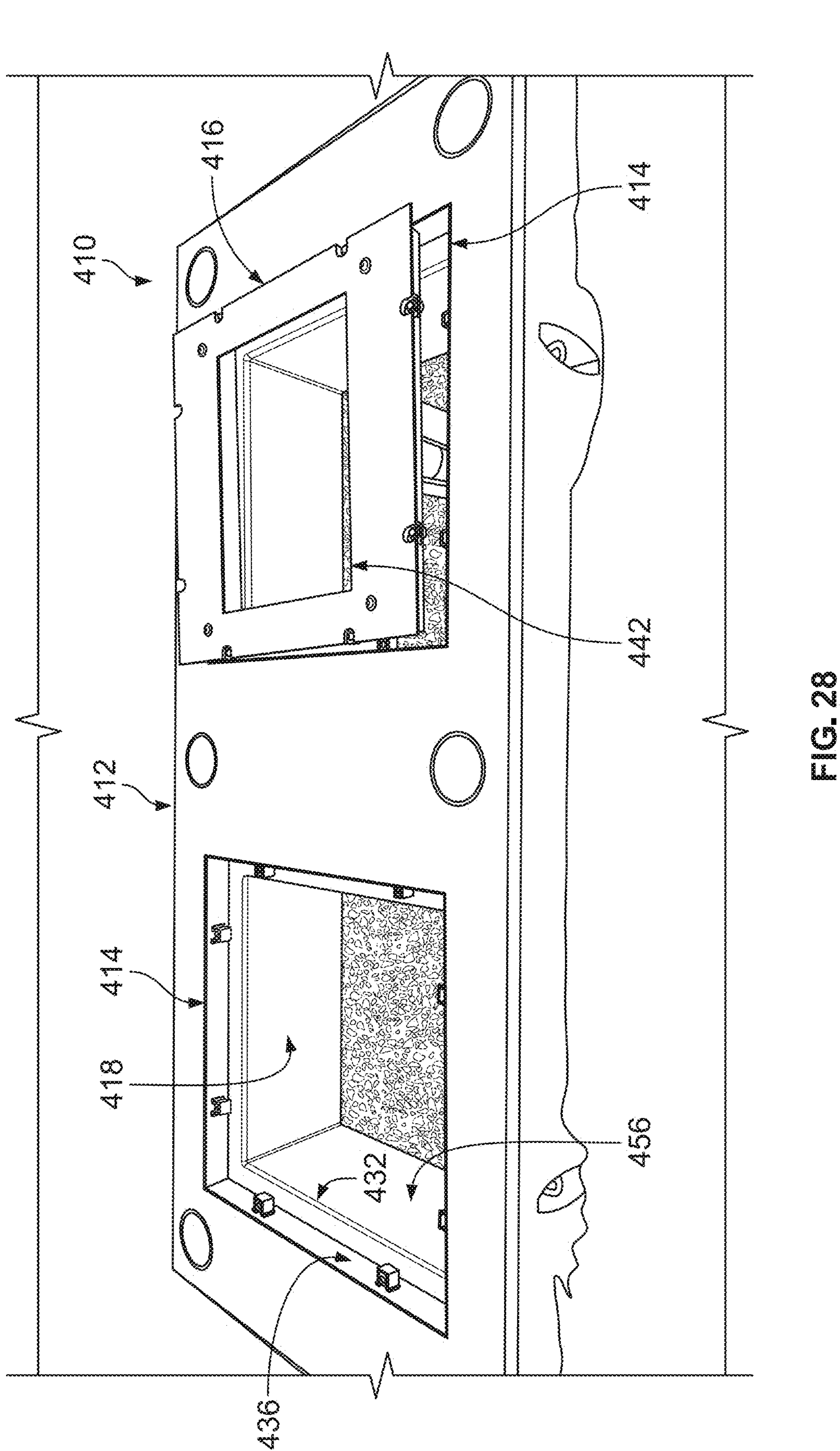
FIG. 28 is a perspective view of the support base of FIG. 27, with one of the mounting plates shown partially installed.
Figure 29:
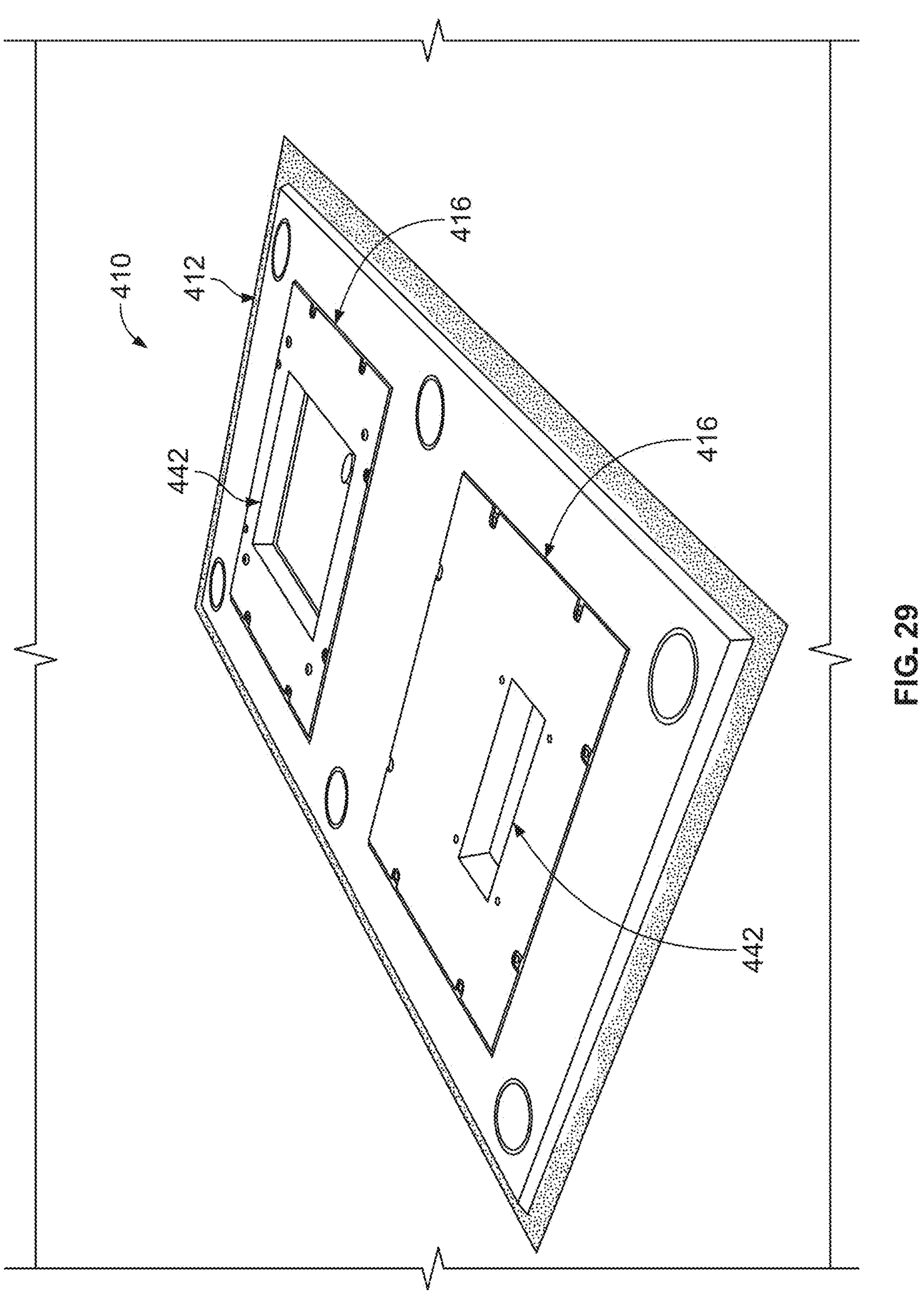
FIG. 29 is a perspective view of the support base of FIG. 27, with both of the mounting plates shown installed.
Figure 30:
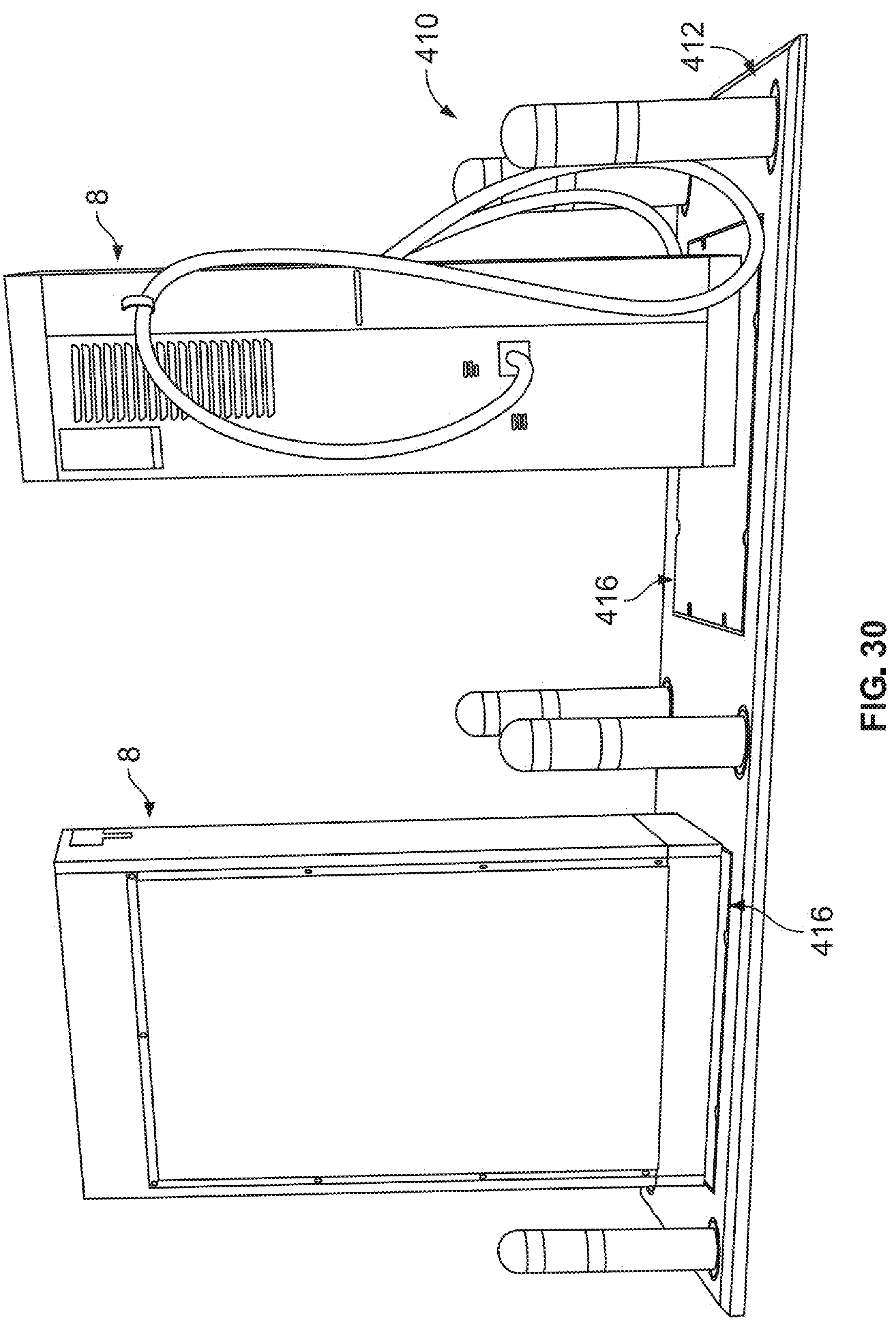
FIG. 30 is a perspective view of the support base of FIG. 27, shown completely installed with the equipment.

FIGS. 25-26 show a pad 312 of an equipment-mounting platform 310 according to a fourth example embodiment. The support base 310 includes the pad 312, at least one optional support frame (not shown), and at least one mounting plate 316 with at least one equipment-specific opening 342, which all cooperate to enable equipment to be mounted to and supported on the base 310. The components of the support base 310 of this embodiment can be the same, or substantially similar, as the embodiments described above, except as expressly noted.

In particular, the pad 312 of this embodiment has integral internal conduits 324 that extend transversely between the pad openings 318 and that provide the same function of providing a passageway for routing cables between the two pieces of equipment, but they are arranged differently. As shown, the pad 312 includes a center chamber 352 with an insulating divider panel 354 that separates the chamber into two sub-chambers, with the divider panel 352 providing electrical insulation and with the sub-chambers providing space for making cable connections, cable routing, etc. The conduits 324 also include conduit segments of the type described above for providing a cabling passageway between the sub-chambers and the pad openings 318. In addition, the pad openings 318 do not extend all the way through the pad 312 from top to bottom. Instead, the pad openings 318 are recesses formed into the top of the pad 312. So the cables are routed up through the chamber 352 between the two pad openings 318, laterally through the integral internal conduits 324 into the pad openings 318, and upward into the bottom of the equipment.

FIGS. 27-30 show an equipment-mounting support base 410 according to a fifth example embodiment. The support base 410 includes a pad 412, at least one support frame 414, and at least one mounting plate 416 with at least one equipment-specific opening 442, which all cooperate to enable equipment 408 to be mounted to and supported on the support base 410. The components of the support base 410 of this embodiment can be the same, or substantially similar, as the embodiments described above, except as expressly noted.

In particular, the support frame 414 of this embodiment includes the peripheral lip 432 and the peripheral upright wall 436, both peripherally extending all the way around the pad opening 418. In addition, the support frame 414 of this embodiment further includes a peripheral downwall 456, which also extends peripherally all the way around the pad opening 418. The peripheral downwall 456 extends downward from the frame lip 432 all the way to the bottom of the pad 418. Thus, the support frame 414 forms a liner for the entirety of the pad opening 418, peripherally all the way around and vertically from the pad bottom to top.

This provides for improved methods of making the support base 418, and can provide increased strength. For example, the support frame 414 can be turned upside down (inverted from depicted) and placed into a mold for casting the pad 412, the casting material (e.g., concrete) can be poured into the mold (between the outer wall do the mold and the support frame 414), and the material can be allowed to harden (e.g., cure) to form the pad-and-frame assembly 412 and 414. For the depicted multi-opening pad 418, multiple of the support frames 414 are emplaced and integral conduit segments 424 are connected between them before pouring the material into the mold. Then the pad- and frame assembly 412 and 414 is turned rightside up and the mold removed, with the pad- and frame assembly 412 and 414 now ready for use.

Accordingly, various features of the support bases of the described and related embodiments can be used in the construction of EV charging stations, and provide for quicker and lower cost builds while also future-proofing the build for changes/upgrades of the EV charging station equipment, without requiring any further foundation, fastening, bollards/protection, or similar.

In another aspect, the invention relates to methods of installing and/or replacing EV charging equipment. The installation method includes installing one of the support bases described herein, installing one or more pieces of EV charging equipment onto the base, and installing the bollards onto the base, with an equipment-specific mounting plate installed based on the equipment to be installed. A small crane can be used for larger pads and equipment, with the entire new installation completed in hours (not days) to reduce installation time and costs. Also, the replacement method includes removing existing bollards from one of the support bases described herein, removing an existing piece of EV charging equipment from the support base, removing the existing mounting plate from the existing pad, installing a new mounting plate onto the existing pad (with the new mounting plate specific to the new piece of equipment to be installed) to form a retrofitted support base, and installing the new equipment onto the retrofitted support base, all without changing out the existing pad.

It is to be understood that this invention is not limited to the specific devices, methods, conditions, and/or parameters described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in example forms, it will be apparent to those skilled in the art that many modifications, additions, and deletions can be made therein without departing from the spirit and scope of the invention as defined by the following claims.

What is claimed is:

1. A support base for mounting electrical equipment powered by underground electrical cables, the support base comprising:

a mounting pad having a pad opening through which the cables are routed into the equipment;

at least one support frame positioned within the pad opening and having a frame opening aligned with the pad opening and through which the cables are routed into the equipment; and at least one interchangeable mounting plate removably attached to and supported by the support frame, the mounting plate having a cable opening aligned with the pad and support openings and through which the cables are routed into the equipment, wherein the cable opening is configured for receiving and routing the cables to the equipment to be mounted, wherein in use the equipment is supported on the mounting plate, which is supported on the support frame, which is supported on the base, wherein the mounting pad includes a ledge that is formed within the pad opening and that supports the support frame in place within the pad opening, and wherein the same pad and support frame can be interchangeably used with a different interchangeable mounting plate configured for receiving and routing the cables to different equipment to be mounted.

2. The support base of claim 1, wherein the ledge extends peripherally all the way around the pad opening.

3. The support base of claim 1, wherein the support frame extends peripherally all the way around the pad opening.

4. The support base of claim 1, wherein the support frame includes a lip that is laterally extending and supported by the mounting pad, wherein the mounting plate is supported by the lip.

5. The support base of claim 1, wherein the mounting plate further includes mounting elements configured for attachment to mounting elements of the equipment to secure the equipment in place.

6. The support base of claim 1, further comprising two upright walls forming a double-wall arrangement that transfers load from the equipment downward through the mounting plate, to the support frame, and to the mounting pad, wherein the two upright walls are formed by the mounting plate and/or the support frame.

7. The support base of claim 1, wherein the support frame is secured to the mounting pad in a nested arrangement within the pad opening, and wherein the mounting plate is supported by the support frame within the pad opening in a nested arrangement with the support frame.

8. A support base for mounting electrical equipment powered by underground electrical cables, the support base comprising:

a mounting pad having a pad opening through which the cables are routed into the equipment;

at least one support frame positioned within the pad opening and having a frame opening aligned with the pad opening and through which the cables are routed into the equipment; and at least one interchangeable mounting plate removably attached to and supported by the support frame, the mounting plate having a cable opening aligned with the pad and support openings and through which the cables are routed into the equipment, wherein the cable opening is configured for receiving and routing the cables to the equipment to be mounted, wherein in use the equipment is supported on the mounting plate, which is supported on the support frame, which is supported on the base, wherein the support frame is secured to the mounting pad in a nested arrangement within the pad opening, and wherein the mounting plate is supported by the support frame within the pad opening in a nested arrangement with the support frame, and wherein the same pad and support frame can be interchangeably used with a different interchangeable mounting plate configured for receiving and routing the cables to different equipment to be mounted.

9. The support base of claim 8, wherein the mounting plate is supported by the support frame in the nested arrangement in a position with the mounting plate flush with a top surface of the mounting pad.

10. The support base of claim 9, wherein the support frame includes a frame upright wall that is inset spaced below a top surface of the mounting pad, and wherein the mounting plate overhangs the frame upright wall and is flush with the top surface of the mounting pad.

11. A support base for mounting electrical equipment powered by underground electrical cables, the support base comprising:

a mounting pad having a pad opening through which the cables are routed into the equipment;

at least one support frame positioned within the pad opening and having a frame opening aligned with the pad opening and through which the cables are routed into the equipment; and at least one interchangeable mounting plate removably attached to and supported by the support frame, the mounting plate having a cable opening aligned with the pad and support openings and through which the cables are routed into the equipment, wherein the cable opening is configured for receiving and routing the cables to the equipment to be mounted, wherein in use the equipment is supported on the mounting plate, which is supported on the support frame, which is supported on the base, wherein the support frame includes a lip that is laterally extending and supported by the mounting pad, wherein the lip of the support frame is positioned and supported on the ledge of the pad opening, wherein the mounting plate is supported by the lip, and wherein the same pad and support frame can be interchangeably used with a different interchangeable mounting plate configured for receiving and routing the cables to different equipment to be mounted.

12. A support base for mounting electrical equipment powered by underground electrical cables, the support base comprising:

a mounting pad having a pad opening through which the cables are routed into the equipment;

at least one support frame positioned within the pad opening and having a frame opening aligned with the pad opening and through which the cables are routed into the equipment; and at least one interchangeable mounting plate removably attached to and supported by the support frame, the mounting plate having a cable opening aligned with the pad and support openings and through which the cables are routed into the equipment, wherein the cable opening is configured for receiving and routing the cables to the equipment to be mounted, wherein in use the equipment s supported on the mounting plate, which is supported on the support frame, which is supported on the base, wherein the support frame includes a lip that is laterally extending and supported by the mounting pad, wherein the mounting plate is supported by the lip, wherein the support frame further includes a frame upright wall that extends upwardly from the lip and that is inset spaced below a top surface of the mounting pad, and wherein the mounting plate overhangs the frame upright wall and is flush with the top surface of the mounting pad, and wherein the same pad and support frame can be interchangeably used with a different interchangeable mounting plate configured for receiving and routing the cables to different equipment to be mounted.

13. A support base for mounting electrical equipment powered by underground electrical cables, the support base comprising:

a mounting pad having a pad opening through which the cables are routed into the equipment;

at least one support frame positioned within the pad opening and having a frame opening aligned with the pad opening and through which the cables are routed into the equipment; and at least one interchangeable mounting plate removably attached to and supported by the support frame, the mounting plate having a cable opening aligned with the pad and support openings and through which the cables are routed into the equipment, wherein the cable opening is configured for receiving and routing the cables to the equipment to be mounted, wherein in use the equipment is supported on the mounting plate, which is supported on the support frame, which is supported on the base, wherein the support frame includes a lip that is laterally extending and supported by the mounting pad, wherein the mounting plate is supported by the lip, wherein the support frame includes a downwall extending downwardly from the lip and a frame upright wall extending upwardly from the lip, wherein the upright wall, the lip, and the downwall are each peripherally extending all the way around the pad opening and are together vertically extending from a bottom to a top of the mounting pad, and wherein the same pad and support frame can be interchangeably used with a different interchangeable mounting plate configured for receiving and routing the cables to different equipment to be mounted.

14. A support base for mounting electrical equipment powered by underground electrical cables, the support base comprising:

a mounting pad having a pad opening through which the cables are routed into the equipment;

at least one support frame positioned within the pad opening and having a frame opening aligned with the pad opening and through which the cables are routed into the equipment; and at least one interchangeable mounting plate removably attached to and supported by the support frame, the mounting plate having a cable opening aligned with the pad and support openings and through which the cables are routed into the equipment, wherein the cable opening is configured for receiving and routing the cables to the equipment to be mounted, wherein in use the equipment is supported on the mounting plate, which is supported on the support frame, which is supported on the base, wherein the support frame includes a lip that is laterally extending and supported by the mounting pad, wherein the lip of the support frame is positioned and supported on the ledge of the pad opening, wherein the mounting plate is supported by the lip, and wherein the mounting plate includes a panel and a plate upright wall extending downward from the panel, wherein the cable opening is formed in the panel, and wherein the plate upright wall is supported on the support frame, and wherein the same pad and support frame can be interchangeably used with a different interchangeable mounting plate configured for receiving and routing the cables to different equipment to be mounted.

15. The support base of claim 14, wherein the plate upright wall extends peripherally all the way around the pad opening.

16. The support base of claim 14, wherein the panel includes a peripheral outer portion that overhangs the support frame with the mounting plate flush with a top surface of the mounting pad.

17. The support base of claim 14, wherein the plate upright wall is positioned laterally inward from an outer edge of the mounting plate to form a lateral offset, the mounting plate includes a plate mounting element positioned within the lateral offset, and the support frame includes a frame mounting element positioned within the lateral offset and aligned with the plate attachment element so that the frame upright wall and the plate upright wall do not interfere with the removable attachment of the mounting plate to the support frame.

18. A method of replacing the electrical equipment on a support base, the equipment powered by underground electrical cables, the support base comprising:

a mounting pad having a pad opening through which the cables are routed into the equipment;

at least one support frame positioned within the pad opening and having a frame opening aligned with the pad opening and through which the cables are routed into the equipment; and at least one interchangeable mounting plate removably attached to and supported by the support frame, the mounting plate having a cable opening aligned with the pad and support openings and through which the cables are routed into the equipment, wherein the cable opening is configured for receiving and routing the cables to the equipment to be mounted, wherein in use the equipment is supported on the mounting plate, which is supported on the support frame, which is supported on the base, wherein the same pad and support frame can be interchangeably used with a different interchangeable mounting plate configured for receiving and routing the cables to different equipment to be mounted, wherein the method comprises:

retrofitting the support base by removing the equipment from the mounting plate, removing the mounting plate from the support frame, installing the different mounting plate onto the support frame, and installing the different equipment to the mounting plate, with the different mounting plate having the different cable opening configured for receiving and routing the cables to the different equipment to be installed, and with the support frame and mounting pad reused with the different mounting plate and the different equipment.

19. A support base for mounting EV charging equipment powered by underground electrical cables, the support base comprising:

a mounting pad having a pad opening through which the cables are routed into the equipment, wherein the mounting pad includes a ledge formed within and extending peripherally all the way around the pad opening;

at least one support frame positioned within and extending peripherally all the way around the pad opening, wherein the support frame has a frame opening aligned with the pad opening and through which the cables are routed into the equipment, wherein the support frame includes a lip that is laterally extending and supported on the ledge, wherein the support frame further includes a frame upright wall that extends upwardly from the lip and supports the mounting plate; and at least one interchangeable mounting plate removably attached to and supported by the support frame and extending peripherally all the way around the pad opening, wherein the mounting plate includes a panel and a plate upright wall extending downward from the panel, wherein the plate upright wall is supported on the lip of the support frame, wherein the panel includes mounting elements configured for attachment to mounting elements of the equipment to secure the equipment in place without penetrating the pad and a cable opening aligned with the pad and support openings and through which the cables are routed into the equipment, wherein the cable opening is configured for receiving and routing the cables of the equipment to be mounted, wherein in use the equipment is supported on the mounting plate, which is supported on the support frame, which is supported on the base, wherein the same pad and support frame can be interchangeably used with a different interchangeable mounting plate configured for receiving and routing the cables to, and for attaching to mounting elements of, different equipment to be mounted.

20. The support base of claim 19, wherein the mounting plate is supported by the support frame in a position with the mounting plate flush with a top surface of the mounting pad.

* * * * *